US012746893B2

(12) United States Patent
Schenk

(10) Patent No.: US 12,746,893 B2
(45) Date of Patent: Sep. 29, 2026

(54) INFLATION HEAD ACCOMMODATING BOTH SCHRADER AND PRESTA VALVES

(71) Applicant: Schenk Designs, LLC, Saratoga Springs, UT (US)

(72) Inventor: Austin Schenk, Saratoga Springs, UT (US)

(73) Assignee: Schenk Designs, LLC, Saratoga Springs, UT (US)

( * ) Notice: Subject to any disclaimer, the term of this patent is extended or adjusted under 35 U.S.C. 154(b) by 0 days.

(21) Appl. No.: 18/625,170

(22) Filed: Apr. 2, 2024

(65) Prior Publication Data

US 2025/0304017 A1 Oct. 2, 2025

(51) Int. Cl.
*B60S 5/04* (2006.01)
*F04B 33/00* (2006.01)
*F16K 15/20* (2006.01)
*G01L 17/00* (2006.01)

(52) U.S. Cl.
CPC ................ *B60S 5/04* (2013.01); *F16K 15/20* (2013.01); *F04B 33/005* (2013.01); *G01L 17/00* (2013.01); *Y10T 137/3724* (2015.04)

(58) Field of Classification Search
CPC ................. B60S 5/04; Y10T 137/3584; Y10T 137/3662; Y10T 137/3677; Y10T 137/3724
USPC ................................................ 141/311 R, 38
See application file for complete search history.

(56) References Cited

U.S. PATENT DOCUMENTS

2013/0186979 A1* 7/2013 Wu ...................... F04B 33/005 239/268
2014/0345747 A1* 11/2014 Wang ...................... F17C 5/06 141/311 R
2015/0053280 A1* 2/2015 Wang ...................... F16K 3/267 137/231
2015/0258970 A1* 9/2015 Chen ...................... B60S 5/04 141/351
2018/0010695 A1* 1/2018 Wang ...................... F16K 1/308

* cited by examiner

*Primary Examiner* — Robert K Arundale
(74) *Attorney, Agent, or Firm* — Dentons Durham Jones Pinegar

(57) ABSTRACT

An inflator head includes a body with an air inlet that receives pressurized gas from a source of pressurized gas, a sheath extending through the body, and a shaft slidably received by the sheath. The shaft includes a primary conduit extending a length of the shaft and opening to a first shaft end, as well as a inflation conduit extending through a sidewall of the shaft from an exterior of the sidewall to the primary conduit. A cap having a valve coupling end is attachable to the first shaft end, an actuating pin having a first pin end and a second pin end is partially housed within the cap or is integral to the first shaft end. The inflator nozzle may engage and selectively open a Presta valve and a Schrader valve.

24 Claims, 17 Drawing Sheets

INFLATION HEAD ACCOMMODATING BOTH SCHRADER AND PRESTA VALVES

TECHNICAL FIELD

This disclosure relates generally to inflation or valve heads for tire pressure inflation devices, and the like; and, more specifically, to a versatile inflation system capable of being easily used with one hand and with different types of valve stems.

BACKGROUND

As many bicycle enthusiasts can attest, makers of tire pressure gauges and inflation devices have yet to develop a satisfactory air chuck or inflator that can easily be used with the two most prominent valve types—Presta valves, also known as French-type valves, and Schrader valves, also known as U.S.-type valves—while still incorporating all the key features of a complete inflation tool (e.g., a nozzle or chuck, a flow valve, a pressure gauge, a bleed valve, etc.). A Presta valve has a thin, small diameter threaded valve stem, and a core that floats. A small nut is secured to the top of the floating core, and the core extends outwardly of the threaded valve stem. By contrast, a Schrader valve has a relatively large diameter valve stem and an interior, spring loaded valve core.

The large majority of bike and car tires have Schrader valves, which were invented in the late 1800s. In order to inflate a Schrader valve, the spring loaded core of the valve must first be depressed to open the flow. The most popular tire inflation air chuck is the ball foot chuck. This design consists of a center tang which maintains closed flow up until it contacts the valve's center pin upon which it opens both valves and free exchange of flow is allowed. As the tang is depressed, and as the tang depresses the spring loaded core of the valve, the Schrader valve also makes contact with a seal incorporated into the chuck which limits escaping air flow. This is a type of the more broad category of closed flow air chucks, which in their neutral position do not allow compressed air to flow through them, until some integral valve is actuated.

A shortcoming of this style of inflator chucks is that there is no way to read pressure or bleed excess pressure without incorporating an upstream valve, a bleed valve and a pressure gauge. This is typically done in such a way that a lever style valve also ends up serving as a handle where a pressure gauge and bleed valve are also incorporated. Typically this multi-function handle is connected back to the chuck by flexible tubing. One hand is used to hold and actuate the flow lever while the other pushes the chuck valve onto the valve stem to maintain the seal and open the flow. Other air chucks exist that similarly consist of a center tang and a surrounding seal, but that have a fixed center tang and an always open flow path—also known as open flow air chucks. These air chucks can be clipped onto the valve to remain in place, but they likewise require some upstream valve in order to control the flow and read the pressure.

Presta valves were also invented around the same time, and are currently widely used on high-end bicycles primarily for their smaller cross-sectional area (i.e., that they are skinnier) which requires less material from the rim be removed to allow them to pass through, resulting in stronger rims. Presta valves have a threaded core which, once unthreaded, allows free flow through the valve (e.g., not spring loaded and no center pin depression required). That is, once unthreaded, the air pressure within the Presta valve may be overcome and compressed air or fluid may be introduced into the open Presta valve. Chucks used to fill these valve types typically only consist of a seal that is pushed down and around the valve stem before the nozzle is pressurized. Some nozzles thread onto the outer diameter of the stem to create a better seal. These chucks are nearly all open flow chucks and require a similar upstream valve in order to control the flow. Similarly, these often consist of lever style valves that also serve as a handle.

Due to the different valve diameters and actuation methods between these two valve stem types, most of the aforementioned designs will only work for one valve type. Consequently, creating an air chuck that can reliably receive, actuate, and seal against both valve types has long been a focus of inventors. However, while many designs have been created to address this issue and interface with both valve types, no satisfactorily simple and easy-to-use designs have been created. Existing designs largely fall into two categories consisting of either a lever actuated inflator head that compresses a single stem seal against either valve stem type or a dual nozzle inflator head which has a nozzle for Schrader valves and a nozzle for Presta valves. Almost all of these designs are open flow designs, and just like most of the single valve type designs mentioned above, also require some upstream valve to regulate the flow (where again a pressure gauge and bleed valve are often incorporated). Many of these designs incorporate a spring loaded center pin which is used to actuate the Schrader valve cores, but can also be pushed back into the inflator head far enough that the skinnier Presta valve can also be received (since Presta valves are longer and thinner they often insert farther into inflator heads/nozzles).

One form of dual nozzle chucks that can accommodate both Presta valves and Schrader valves utilizes a T-shaped air chuck, with one side adapted to fit a Presta valve and another side adapted to fit a Schrader valve. However, using such a chuck requires a user to manipulate it in order to accommodate the specific valve type at hand. A version of the single nozzle air chuck that can be used with both Presta valves and Schrader valves is one that employs multiple small parts that are rearranged by the user every time a different valve is desired. The manipulation of these small pins and grommets is tedious and susceptible to lost parts which can render the chuck useless.

These additional steps of actuating a lever, selecting the correct nozzle for the correct valve, or rearranging components are typical of most air chucks currently on the market that can receive either Presta or Schrader valves and result in wasted time. Additionally, most of the existing mechanisms are complex with multiple small parts, and still only perform the function of mating to the valve while still requiring additional valves, pressure ports and bleed valves to make up a fully capable tire inflator. All of this typically results in increased size, higher cost of parts, higher cost of assembly, increased weight and undesirable complexity when actually trying to use the product.

SUMMARY

Disclosed are systems, devices, and/or methods of use thereof regarding inflation heads for tire pressure inflation devices. In various aspects, an inflator includes a body with a conduit that receives pressurized gas from a source of pressurized gas and a sheath extending through the body. The inflator also includes a shaft slidably received by the sheath and having a first shaft end and a second shaft end, where the shaft is oriented transversely to the body. The shaft may include a primary conduit extending through a length of the shaft and opening to the first shaft end, as well as an inflation conduit extending through a sidewall of the shaft from an exterior of the sidewall to the primary conduit. The second shaft end may define a pressure port. The inflator further includes a cap attachable to the first shaft end and having a valve coupling end and an outer spring biasing the cap away from the body. The inflator may engage and selectively open a Presta valve or a Schrader valve.

Specifically, a pin housed within the cap may press against a pin within the Schrader valve, thereby opening the Schrader valve and allowing air or another compressed fluid to flow therein. For a Presta valve, a pin housed within the cap is pressed or recessed into the shaft to accommodate the Presta valve. The pin housed within the cap will also press against the pin within the Presta valve, thereby overcoming the pressure within the Presta valve and allowing air or another compressed fluid to flow therein.

In various aspects, an inflation system includes an inflator head having a body defining a central lumen or sheath, an air inlet, and a bleed port valve. The system also includes a shaft having a first end and a second end slidably received within the sheath of the body, and a cap attachable to the first end of the shaft. The inflator head may also include a pin received within the cap. The inflation system also includes a pressure gauge attachable to the second end of the shaft and a handle attachable to the body. The shaft is movable from a first position to a second position different than the first position. Additionally, the inflator head is closed and does not allow air to flow through the inflator head when the shaft is in the first position.

In various aspects, a method of inflation includes positioning an inflator head over an inflation valve, where the inflator head is initially in a closed flow configuration. The method also includes engaging the inflation valve with a first position of the inflator head and measuring a pressure while the inflator head is in the neutral closed flow configuration. Further, the method includes compressing the inflator head to an open flow configuration, and flowing fluid through the opened inflator head.

In various aspects, a method of delivering a pressurized fluid includes positioning an inflator head over a valve, where the inflator head is in a closed flow configuration preventing a flow of fluid through the inflator head. The method also includes bleeding excess pressure through a bleed valve of the inflator head while the inflator head is in the closed flow configuration and depressing a shaft of the inflator head into a body of the inflator head, thereby placing the inflator head in an open flow configuration. The method further includes delivering a pressurized fluid through the inflator head in the open flow configuration.

In various aspects, an inflator head includes a body defining an air inlet and a shaft slidably received by the body, where the shaft has a first shaft end and a second shaft end opposite the first shaft end. The shaft may also include a pin integral with the first shaft end. The inflator head may be in a closed flow configuration when the shaft is in a first position within the body and in an open flow configuration when the shaft is in a second, depressed position within the body.

In various aspects, an inflator head includes a body with an inlet that receives pressurized gas from a source of pressurized gas, the body defining a bleed port valve adjacent to the inlet, where the bleed port valve not in fluid communication with the conduit. The inflator head additionally includes a sheath extending through the body, and a shaft slidably received by the sheath and having a first shaft end and a second shaft end. The shaft may include a primary conduit extending through a length of the shaft and opening to the first shaft end, where the primary conduit is in fluid communication with the bleed port valve when the shaft is in a first position. The shaft may also include an inflation conduit extending through a sidewall of the shaft from an exterior of the sidewall to the primary conduit, where the inflation conduit is in fluid communication with the conduit of the body when the shaft is in a second position different than the first position, and a pin at the first shaft end. The inflator head may further include a cap attachable to the first shaft end and having a valve coupling end.

Importantly, the inflation systems, devices, and methods disclosed herein do not require a user to change out parts (e.g., the inflator head) in order to accommodate a Presta valve and/or a Schrader valve. Additionally, the user is not required to manipulate any parts, such as changing out pieces, grasping a lever, or rotating the inflator head. Rather, the systems and devices disclosed herein can accommodate both a Presta valve and/or a Schrader valve based on different positions of the inflator head, such as the positions of an internal spring loaded pin within the inflator head. This greatly simplifies the overall systems and devices, as well as providing users with a one-hand inflation technique. In contrast, current inflation devices require users to utilize both hands or manipulate components (e.g., levers, inflator heads) in order to accommodate both a Presta valve and a Schrader valve. Additionally, the inflation device herein includes some or all of the key features of an inflator, namely a nozzle or chuck, a flow valve, a pressure gauge, and a bleed valve. When configured with all these features it forms a complete inflation system, such that when paired with an air compressor, no secondary pressure gauges, bleed valves, tools or otherwise are needed to be able to check, fill and bleed a pressurized system.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 1A:
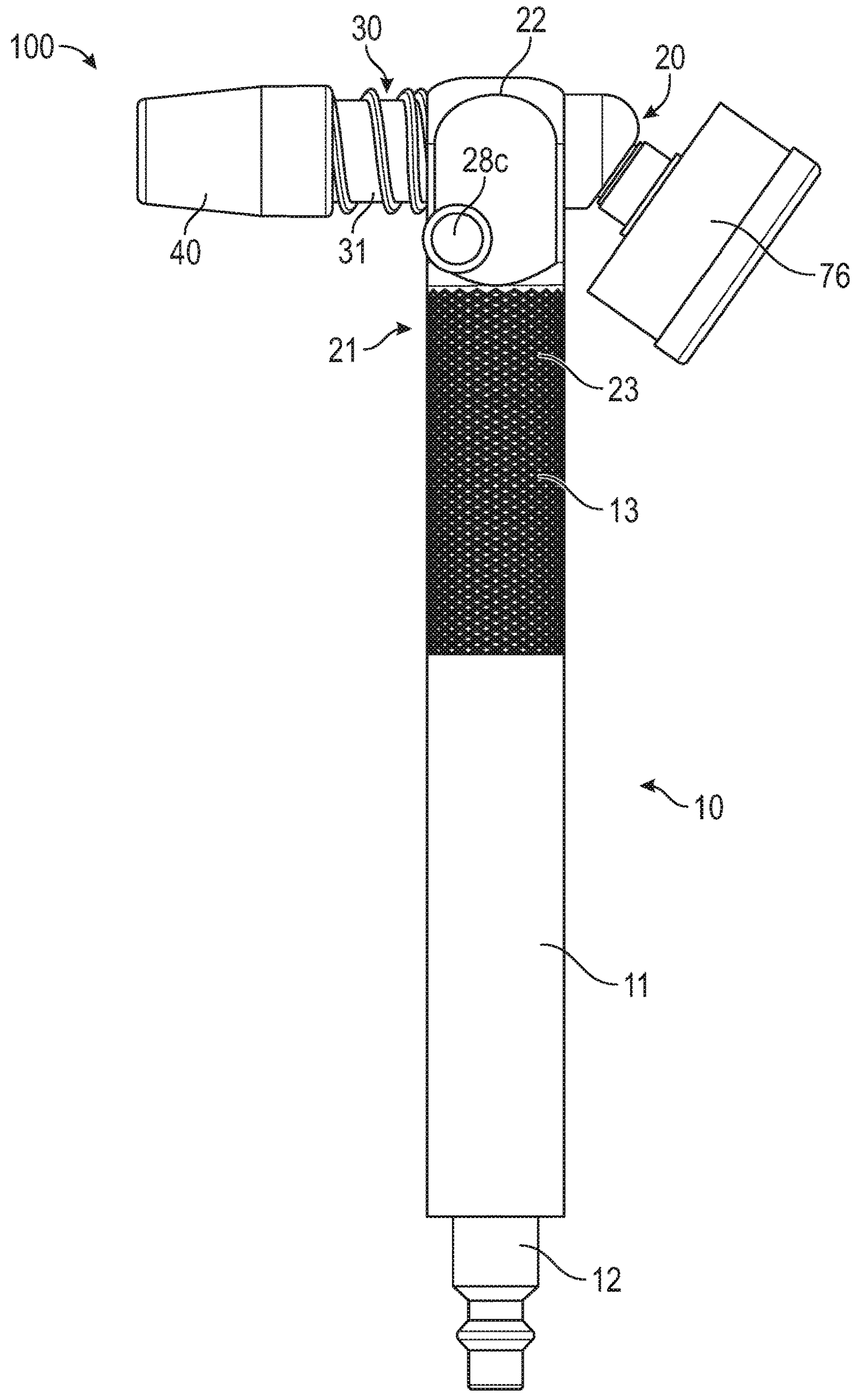
FIGS. 1A through 1C illustrate an inflation system for connecting an air chuck or inflator head to a valve in order to deliver a pressurized fluid through the valve.
Figure 1B:
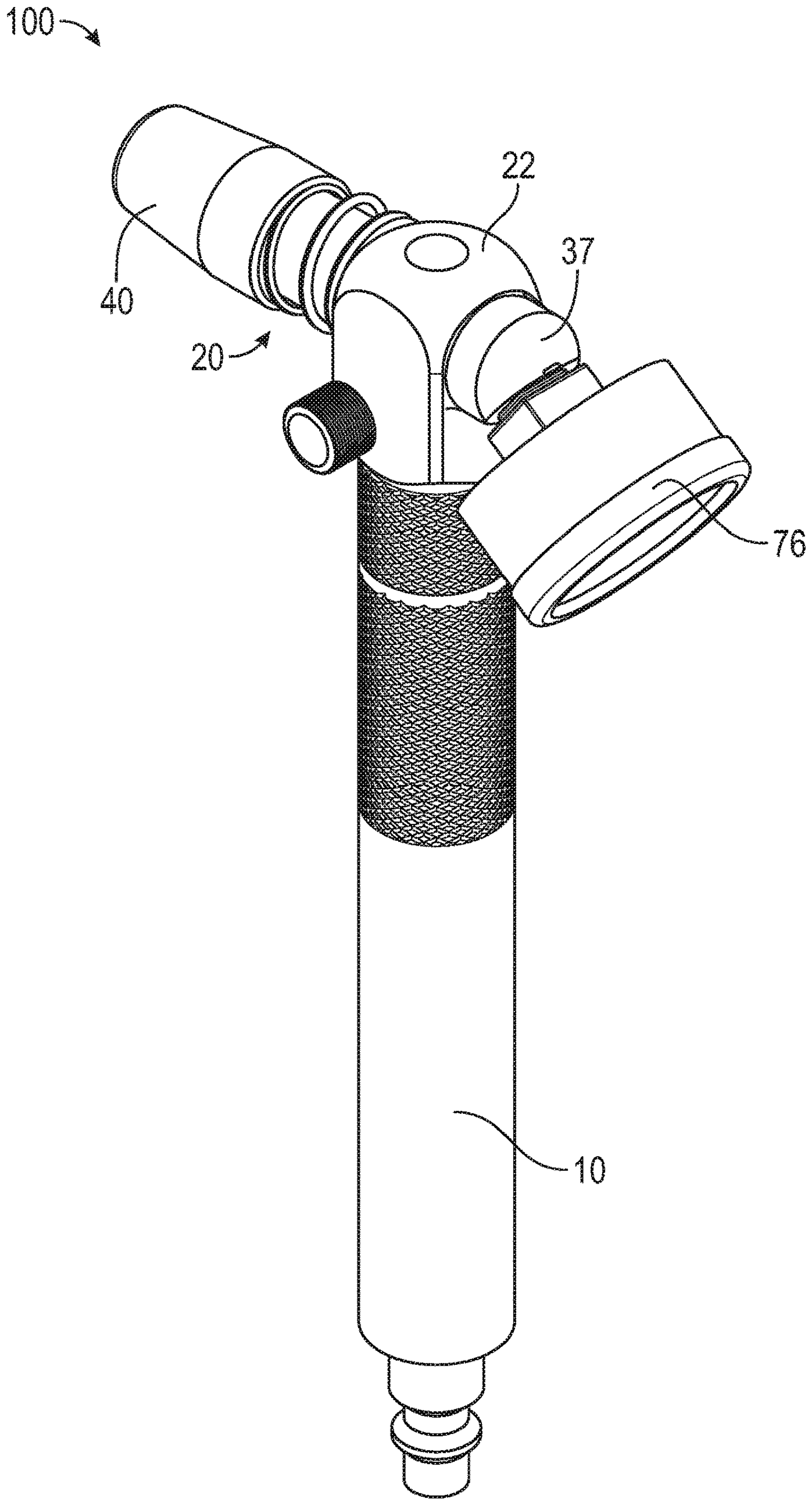
Figure 1C:
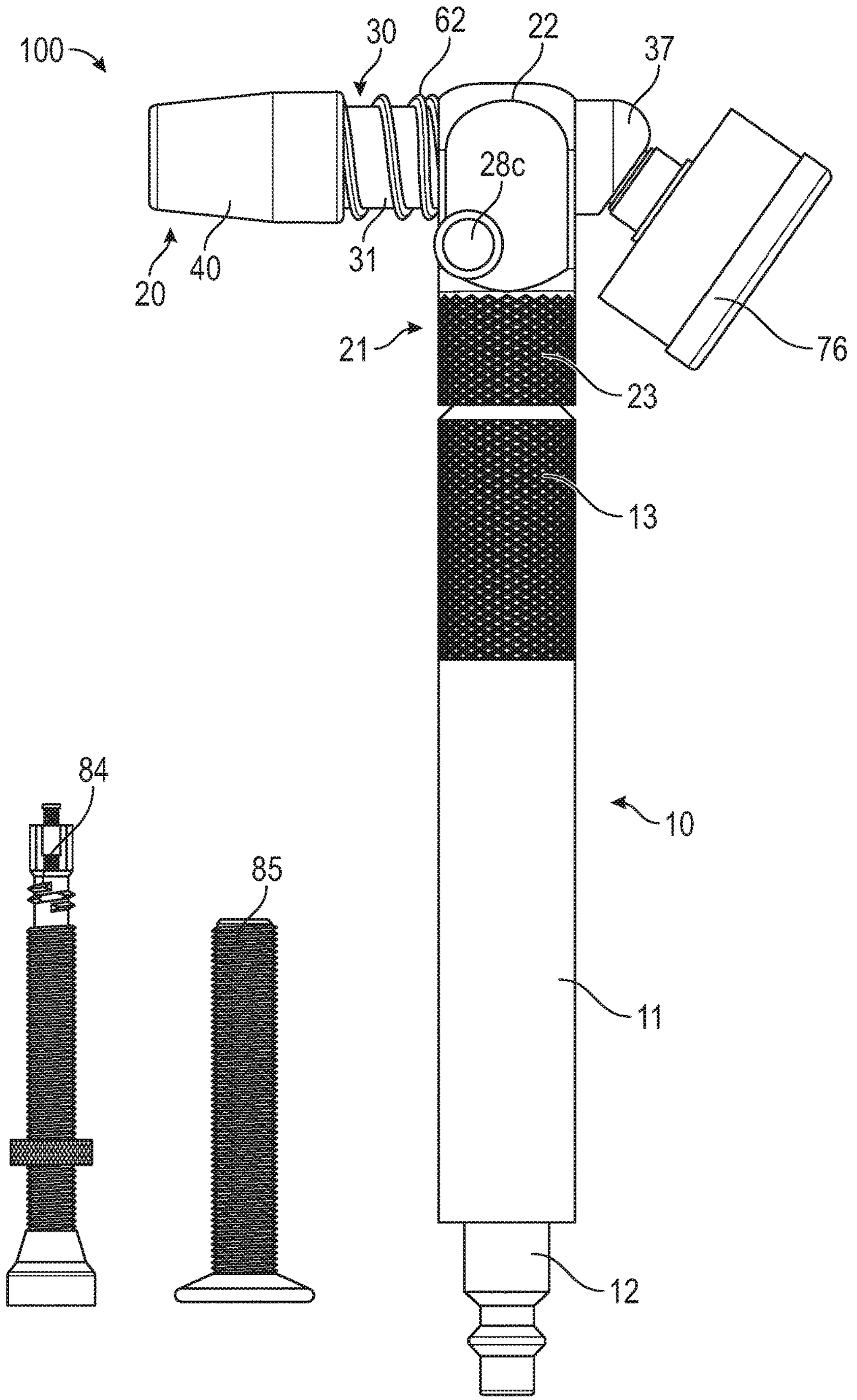

FIGS. 1A through 1C illustrate an inflation system 100 for connecting an air chuck or inflator head to a valve in order to deliver a pressurized fluid through the valve. Specifically, FIG. 1A illustrates a side view of the inflation system 100, FIG. 1B illustrates a back perspective view of the inflation system 100, and FIG. 1C illustrates the inflation system 100 of FIG. 1A next to a Presta Valve 84 and a Schrader Valve 85, both of which can be accommodated by the inflation system 100.

Referring to FIGS. 1A through 1C, the inflation system 100 includes a handle 10 and an inflator head 20 attachable to the handle 10. The inflator head 20 may be oriented transversely to the handle 10. The handle 10 includes a handle body 11 having a first end 12 and a second end 13 opposite the first end 12. The first end 12 includes a quick-disconnect attachment for attaching the inflation system 100 and/or the handle 10 to an air compressor or other source of pressurized fluid (see FIG. 5, where the quick-disconnect attachment is connected to a source of pressurized fluid 80 through tubing 82). The quick-disconnect attachment may be removably attached to the body 11 of the handle 10, such as through threading or another appropriate coupler. For example, the body 11 may include internal threads near the first end 12 and the quick-disconnect attachment may include threads to mate with and engage the internal threads (see FIG. 2—where quick-disconnect attachment is screw-threaded into the first end 12).

Figure 2:
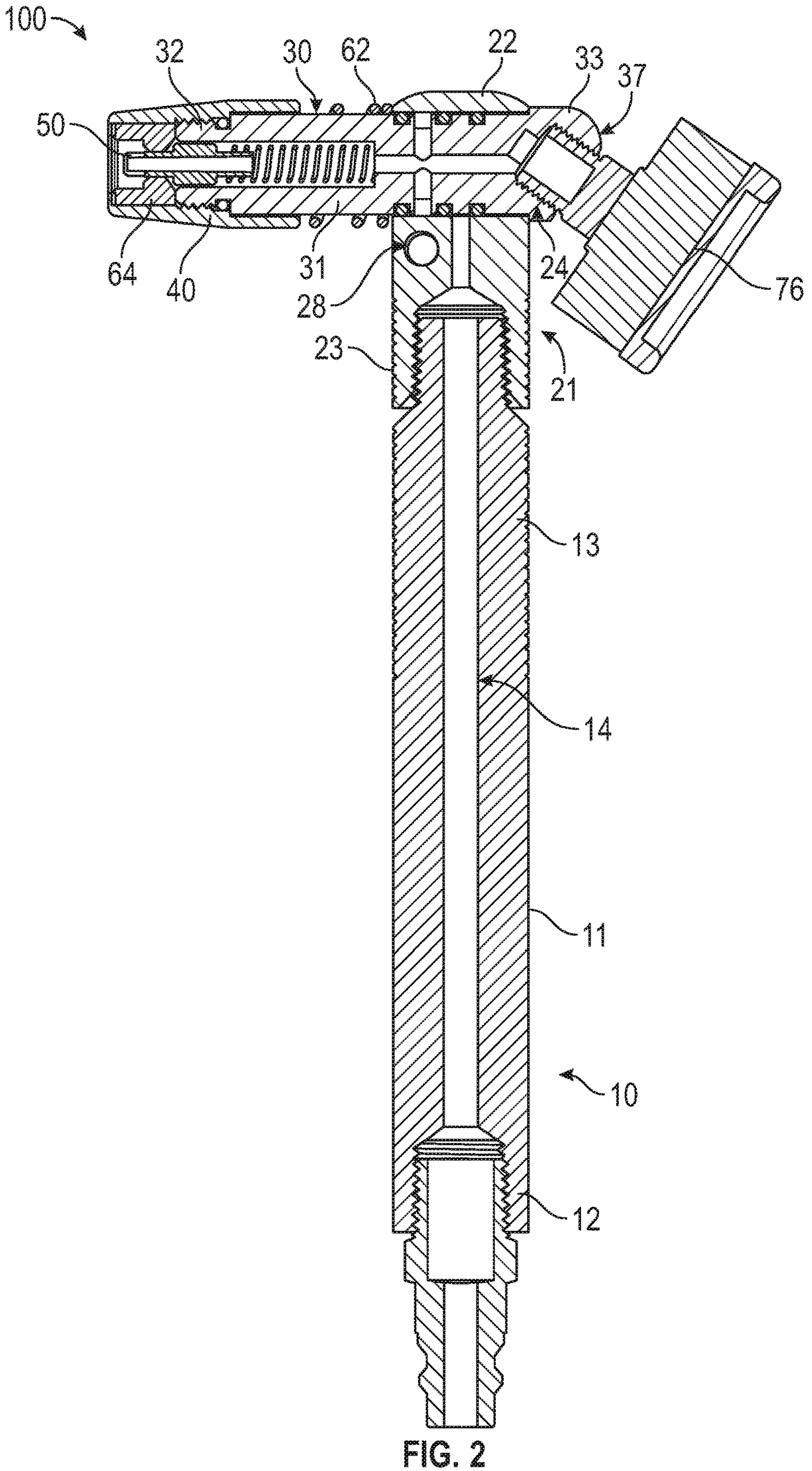
FIG. 2 illustrates a cross-sectional view of the inflation system of FIGS. 1A through 1C.

The second end 13 includes threading or other couplers (e.g., pins, detents, clips, seals, etc.) for attaching the inflator head 20 to the handle 10. Referring briefly to FIG. 2, the body 11 of the handle 10 defines an internal channel 14 for fluidly connecting the inflator head 20 to an air compressor or other source of pressurized fluid. Specifically, the internal channel 14 facilitates a flow of pressurized fluid from a source of pressurized fluid, through the handle 10 and into the inflator head 20. Depending on a position of the inflator head 20, the pressurized fluid can flow through the inflator head 20 and into a valve (e.g., a Presta valve 84 or Schrader valve 85) to inflate an item, such as a tire.

The inflator head 20 includes a body 21 having a top end 22 and a bottom end 23 opposite the top end 22. Defined between the top end 22 and the bottom end 23 is a sheath or channel 24 (see FIG. 2) that extends through the body 21. Defined in the bottom end 23 of the body 21 is a coupling cavity 27 to receive the second end 13 of the handle 10. The coupling cavity 27 may contain threading to engage with threading at the second end 13 of the handle 10. Also defined near the bottom end 23 is an air inlet 26 that is in fluid communication with the internal channel 14 of the handle 10. The air inlet 26 may fluidly connect the handle 10 with the inflator head 20, such that pressurized fluid can flow from a source of pressurized fluid, through the handle 10 (i.e., through the internal channel 14), through the air inlet 26, and into the inflator head 20.

The body 21 also defines a bleed valve port 28 adjacent to the air inlet 26. As discussed herein with respect to FIGS. 4A through 4E, the bleed valve port 28 may be in fluid communication with the shaft 30 slidably received by the body 21, such that excess pressure from an item being inflated (e.g., a tire or other pneumatic device) may be bled out of the item through the bleed valve port 28. Notably, the bleed valve port 28 is not in fluid communication with the air inlet 26.

Figure 3A:
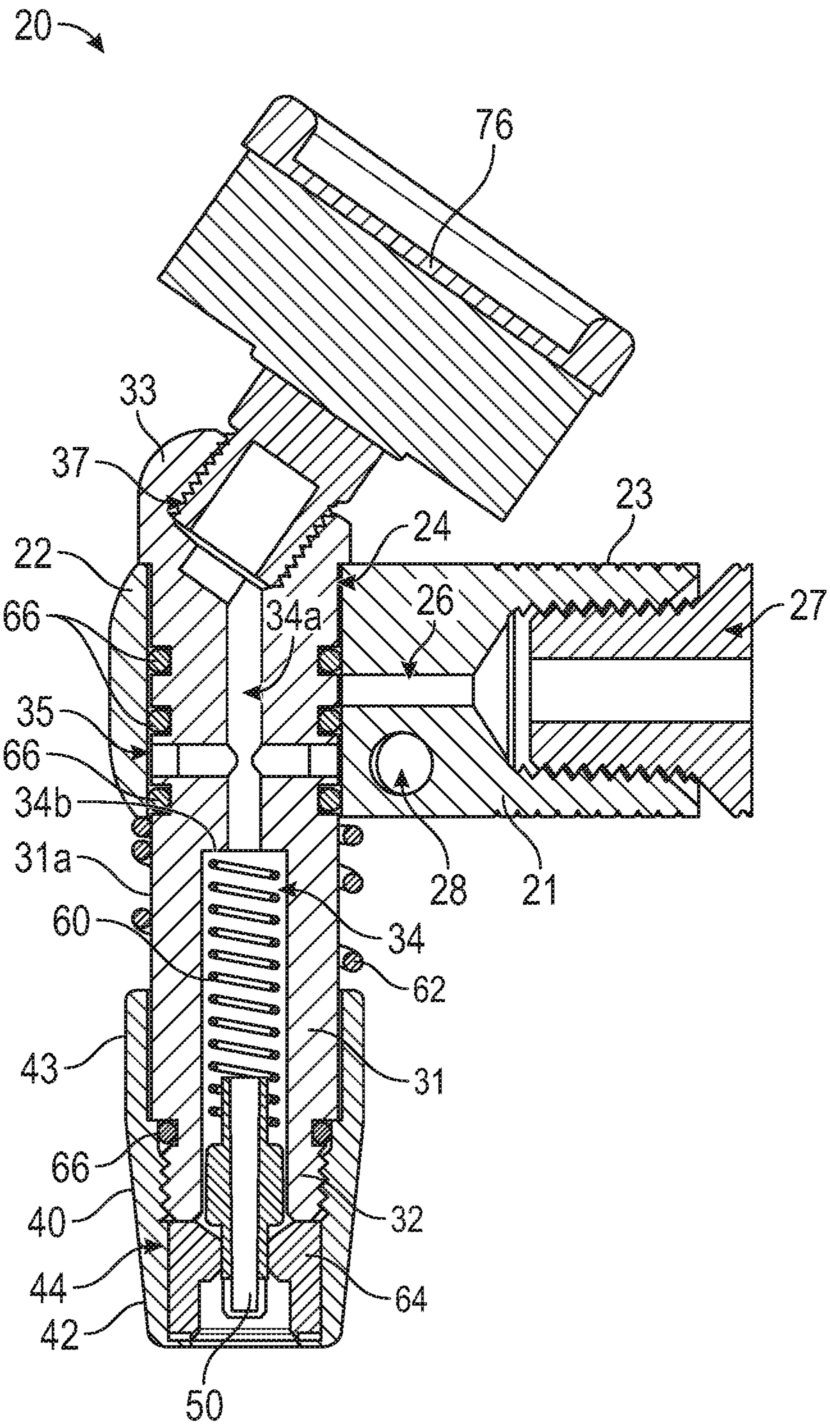
FIGS. 3A through 3C illustrate cross-sectional views of the inflator head and pressure gauge of FIGS. 1A through 1C.
Figure 3B:
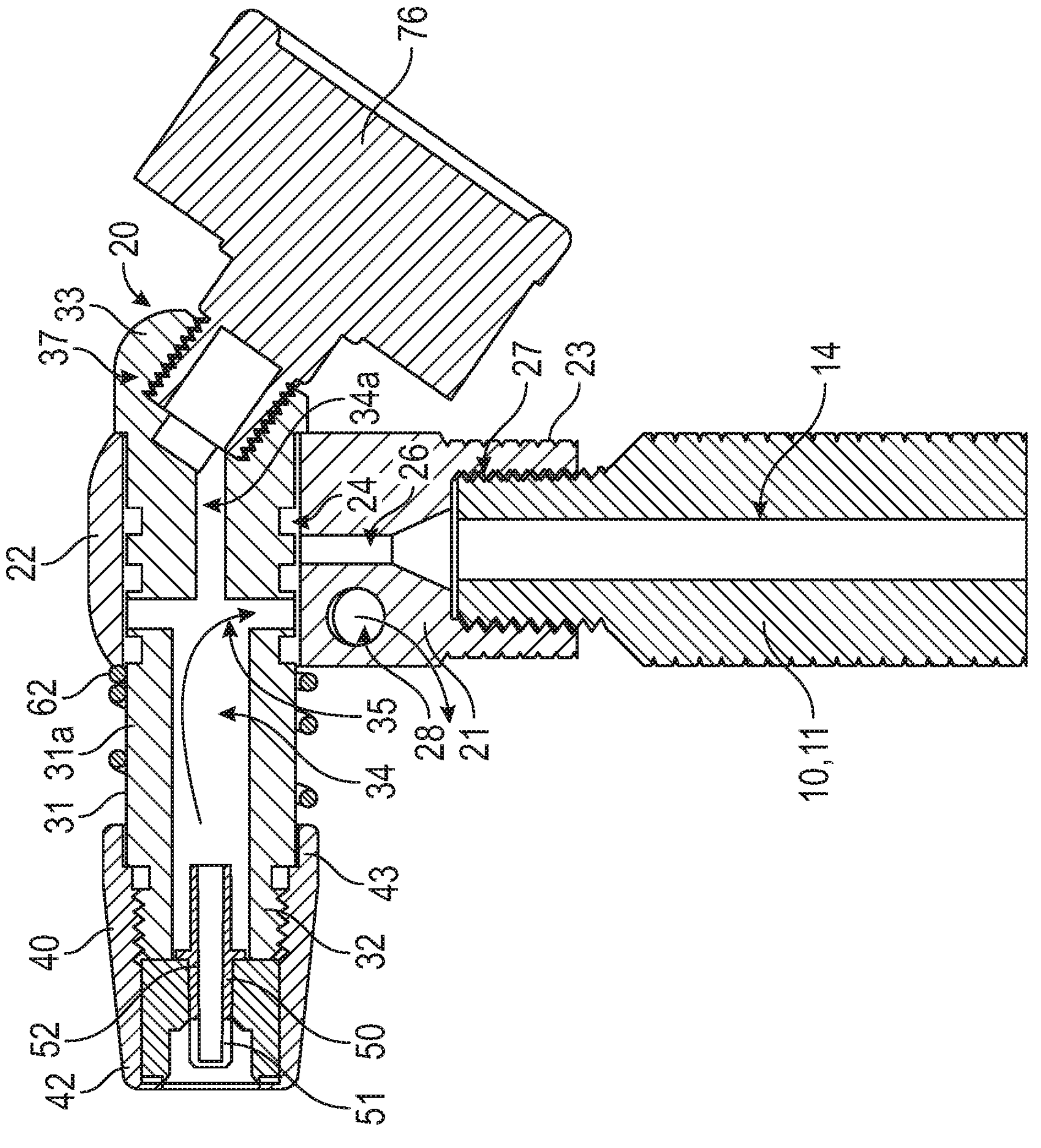
Figure 3C:
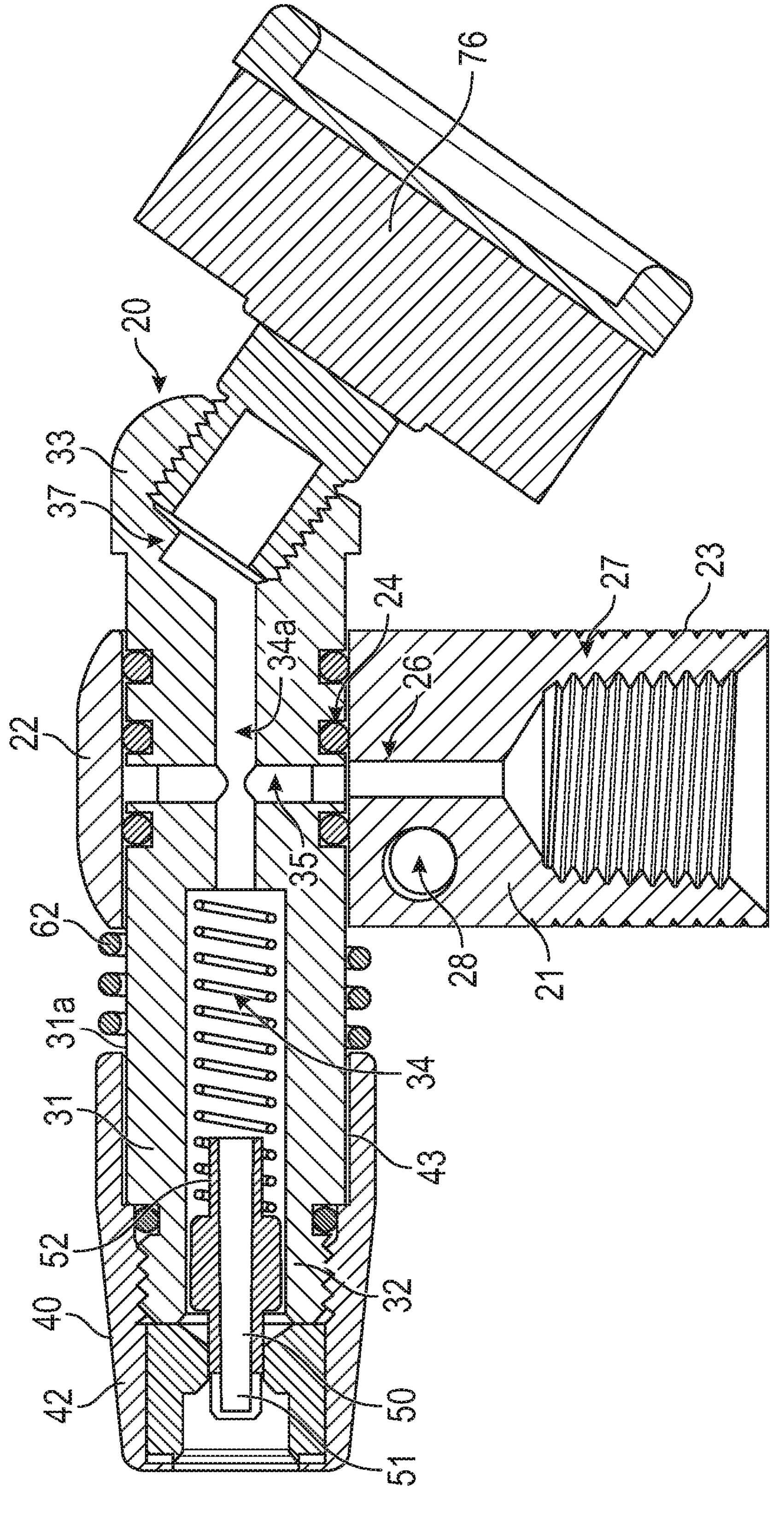

The inflator head 20 also includes a shaft 30 slidably received within the sheath or channel 24 of the body 21. As illustrated in FIG. 2, the shaft 30 is received within the body 21 in a first position, such that the inflator head 20 is in a neutral, closed-flow configuration. The shaft 30 has a body 31 with a first shaft end 32 and a second shaft end 33 opposite the first shaft end 32. A pressure gauge 76 is connectable to the second shaft end 33. For example, as illustrated in FIG. 2, the pressure gauge 76 may be directly attachable to the second shaft end 33 through pressure port 37 defined in the second shaft end 33. Alternatively, the pressure gauge 76 may be attachable to the pressure port 37 through a connector Referring to FIGS. 3A through 3C, illustrating cross-sectional views of the inflator head 20, the shaft 30 and/or the body 31 defines a primary conduit 34 that extends from the first shaft end 32, through the body 31, and to the second shaft end 33. The primary conduit 34 may house an internal spring 60, which may bias a pin 50 towards the first shaft end 32. The primary conduit 34 at locations near the second shaft end 33 may narrow, such as at the narrow portion **34*a* of the primary conduit 34 in FIG. 3A. This point of change from the primary conduit 34 to a more narrow portion 34*a* defines an internal shoulder 34*b*. The internal spring 60 rests against this internal shoulder 34*b* and is used to properly locate the internal spring 60 within the shaft 30. Alternatively, the primary conduit 34 may have a substantially consistent diameter as the primary conduit 34 extends from the first shaft end 32 to the second shaft end 33. At the second shaft end 33, the narrow portion 34*a* may widen out again, or alternatively, the primary conduit 34 may widen into a pressure port 37. For example, the narrow portion 34*a* of the primary conduit 34 widens into a pressure port 37 defined in the second shaft end 33. The pressure port 37 can receive an adaptor to connect a pressure gauge 76 to the inflator head 20, or directly receive the pressure gauge 76** (FIG. 3A).

The shaft 30 and/or the body 31 also defines an inflation conduit 35 extending through a sidewall **31*a* of the body 31. Specifically, the inflation conduit 35 extends from an exterior of the sidewall 31*a* and opens into the primary conduit 34. The shaft 30 may be cylindrical and/or symmetrical, such that the sidewall 31*a* and the body 31 are a unitary piece. The inflation conduit 35 may be disposed between or around seals 66, where the seals 66 are for sealing off any additional, unwanted, or accidental air pathways within the inflator head 20. Depending on a position of the shaft 30 within the sheath 24 and relative to the body 21, the inflation conduit 35 can be in fluid communication with the air inlet 26 of the body 21 (see FIG. 3C), such that pressurized fluid can flow from the source of pressurized fluid, through the handle 10 (i.e., through the internal channel 14), through the air inlet 26, and into the inflation conduit 35. As the inflation conduit 35 is disposed between or around seals 66, the inflation conduit 35 is not closed or sealed off and can receive a flow of air from the air inlet 26 when the inflation conduit 35 is aligned with the air inlet 26. Once in the inflation conduit 35, the pressurized fluid may flow into the primary conduit 34 and out of the inflator head 20**.

Specifically, the inflator head 20 has primarily two positions. The first neutral, closed position (FIGS. 3A and 3B) is where the second shaft end 33 abuts the body 21 and the inflation conduit 35 is not aligned with the air inlet 26. In this position, a pressure of the item being inflated (e.g., a tire) can be measured by the pressure gauge 76 as the primary conduit 34 extends from the first shaft end 32 to the second shaft end 33 and into the pressure port 37, which is fluidly connected to the pressure gauge 76. In this position, the primary conduit 34 is also fluidly connected to the bleed valve port 28. The second compressed, open position (FIG. 3C) is where the shaft 30 has slid within the body 21 such that the first shaft end 32 is closer to the body 21 and the second shaft end 33 has moved away from the body 21. In the second position, the inflation conduit 35 is aligned with the air inlet 26, such that air or another pressurized fluid may flow through the handle 10 into the inflation conduit 35, through the primary conduit 34, and out of the inflator head 20.

The inflator head 20 further includes a cap 40 attachable to the first shaft end 32. In some embodiments, the cap 40 is screwed on to the first shaft end 32 via threading. Alternatively, the cap 40 may be snap fit, press fit, or friction fit to the first shaft end 32. The cap 40 defines a cap lumen 44 extending from an open first end 42 to an open second end 43 of the cap 40. The open second end 43 may include internal threading to attach the cap 40 the first shaft end 32. The open first end 42 may facilitate attachment of the inflator head 20 to a valve and may be referred to herein as the "valve coupling end 42." The valve may be a Presta valve 84, a Schrader valve 85, or another fluid valve type.

The cap 40 houses a stem seal 64 and may additionally house a pin 50. In some embodiments, the pin 50 is an actuating pin 50. Alternatively, the pin 50 may be integral with the shaft 30 (see FIGS. 10A and 10B) or may be fixed and yet not integral within the shaft 30. The pin 50 may be surrounded by and extend through the stem seal 64 (e.g., may extend through a hole or void defined in the stem seal 64). As illustrated in FIG. 3B, the pin 50 may have a first pin end 51 and a second pin end 52 opposite the first pin end 51. The second pin end 52 may extend into the primary conduit 34 of the shaft 30. The shaft 30 houses a spring 60 within the primary conduit 34, where the spring 60 may be for biasing the pin 50 (e.g., the first pin end 51) toward the valve coupling end 42 of the cap 40.

Disposed between the cap 40 and the body 21 is an outer spring 62. The outer spring 62 may be disposed concentrically around the shaft 30. The outer spring 62 may bias the cap 40 away from the body 21. The outer spring 62 may encircle a portion of the shaft body 31 and, additionally, bias the shaft body 31 (e.g., the first shaft end 32) away from the body 21 and towards the valve coupling end 42 of the cap. In this configuration, the outer spring 62 has not been compressed, the inflation conduit 35 of the shaft 30 is not aligned with the air inlet 26 of the body 21, and the inflator head 20 is in the first, neutral closed flow configuration, such that no air or pressurized fluid may flow through the inflator head 20.

Figure 4A:
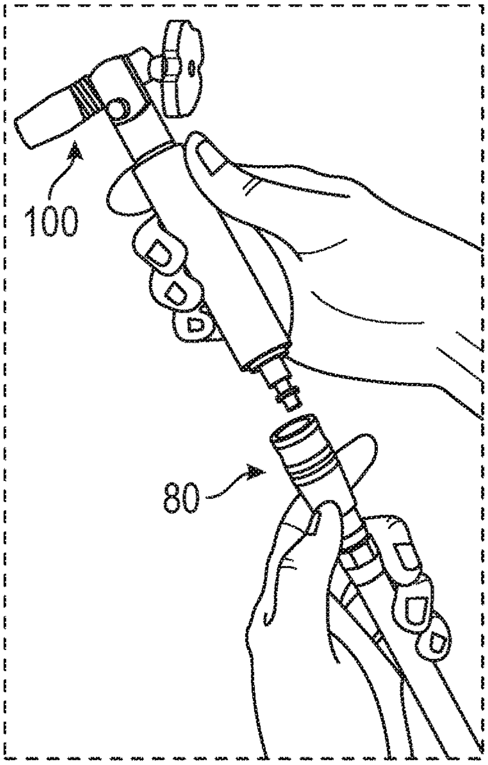
FIGS. 4A through 4E schematically illustrate use of the inflation system of FIGS. 1A through 1C.

When the inflator head 20 and the valve coupling end 42 of the cap 40 are positioned over a valve (e.g., a Presta valve 84 or Schrader valve 85) and a force is exerted on the inflator head 20, the pin 50 and/or the shaft 30 may move relative to the body 21. For example, FIGS. 4A through 4E schematically illustrate use of the inflation system 100 to measure a pressure of a tire. In FIG. 4A, the inflation system 100 is attached to a source of pressurized fluid 80 through the quick-disconnect attachment at the first end 12 of the handle 10. Referring briefly to FIG. 5, the inflation system 100 attaches to the source of pressurized fluid 80 through tubing 82. A first end 81 of the tubing 82 attaches to the quick-disconnect attachment at the first end 12 of the handle 10 and a second end 83 of the tubing 82 attaches or is otherwise coupled to the source of pressurized fluid 80.

Figure 4B:
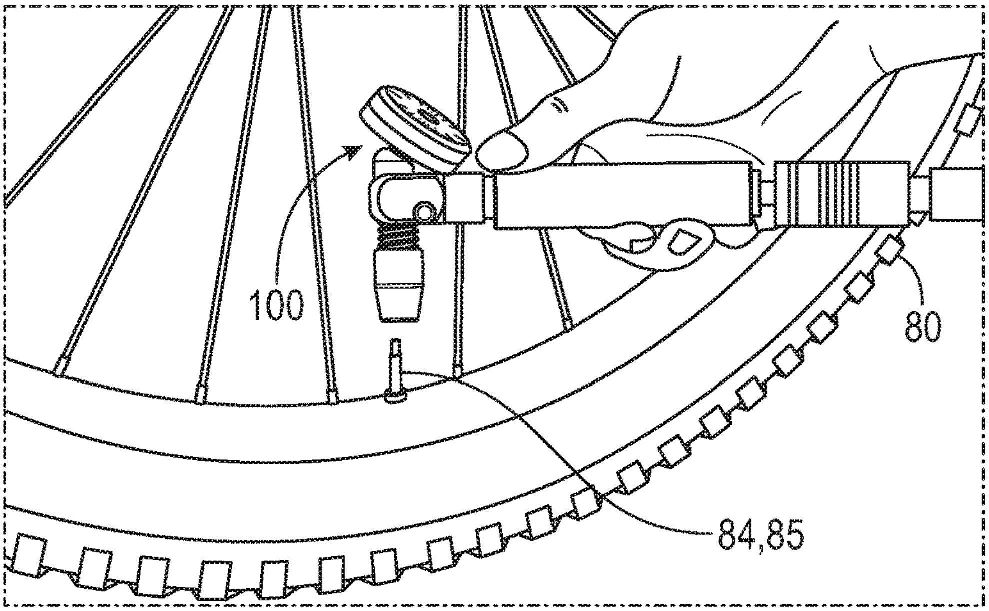
Figure 4C:
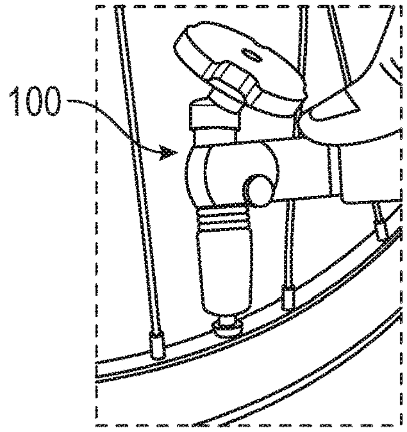
Figure 4D:
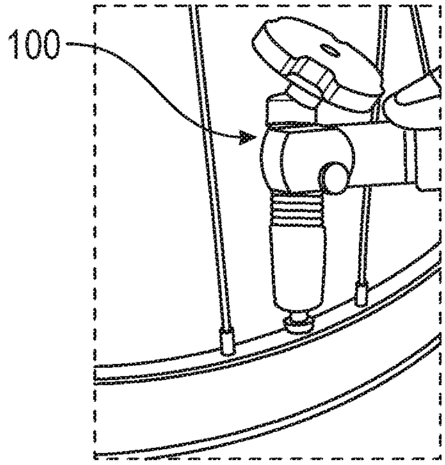
Figure 5:
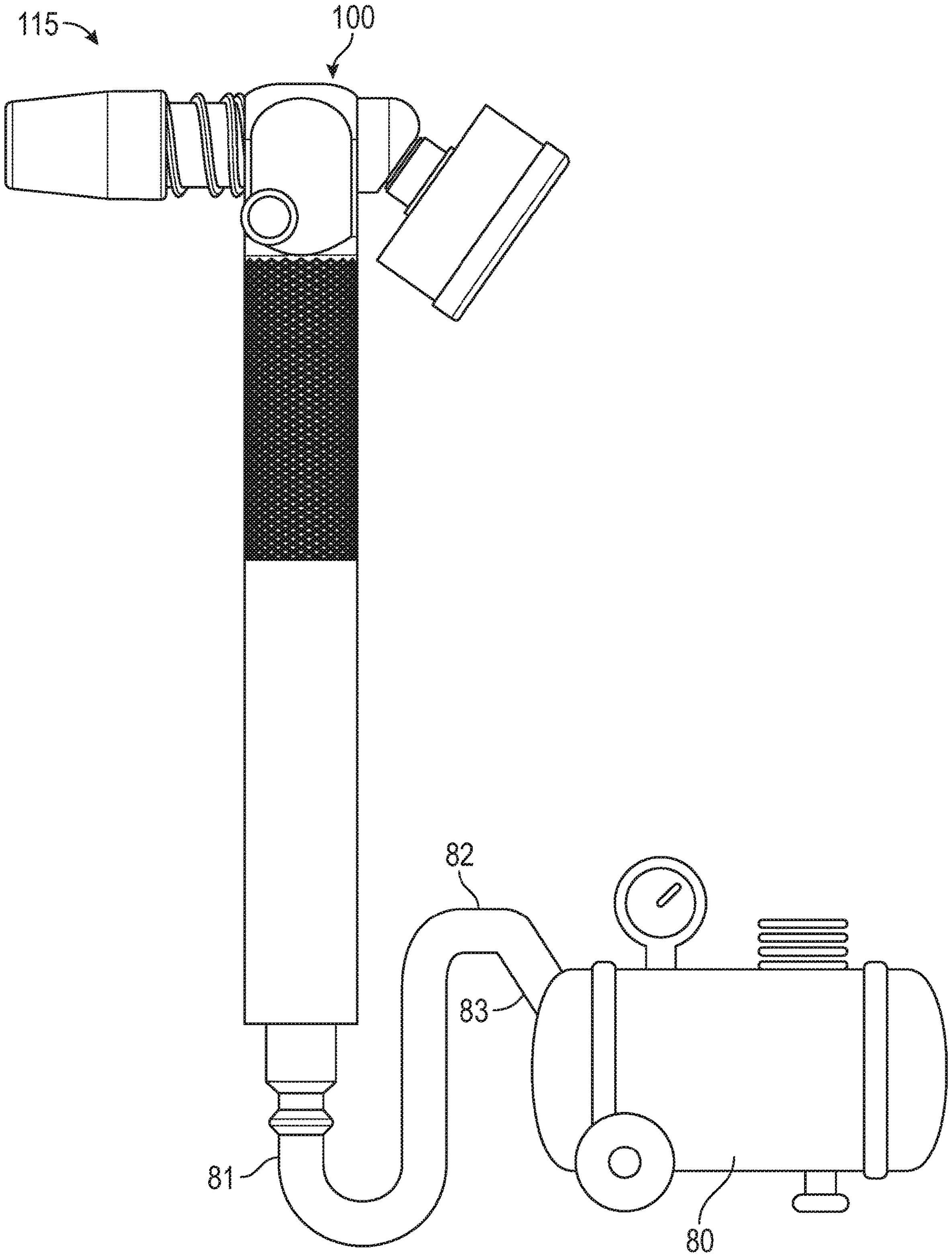
FIG. 5 illustrates the inflation system of FIGS. 1A through 1C attached to a source of pressurized fluid.

In FIG. 4B, the inflation system 100, where the inflator head 20 is in a closed flow configuration, is positioned over a valve 84, 85. Once the inflation system 100 is positioned over the valve 84, 85, a force is exerted on the inflation system 100 to fully seat the stem seal 64 over the valve 84, 85. As illustrated in FIG. 4C, the inflator head 20 is compressed from the first neutral, closed position to the second compressed, open position to fully seat the stem seal 64 on the valve 84, 85. In FIG. 4D, the force exerted on the inflation system 100 is reduced to allow the inflator head 20 to go back into the first neutral, closed position while maintaining the inflation system's 100 engagement with the valve 84, 85. It is the snap fit, press fit, or friction fit of the stem seal 64 against the valve stems that facilitates the change from the compressed to the neutral position of the inflator without becoming unseated from the valve stems. While this embodiment of the invention uses the stem seal 64 to both seal against the valve stem and provide some clamping force to hold it in place, these functions could be performed with more complicated combinations of metal, rubber or plastic clamping and sealing mechanisms.

Figure 4E:
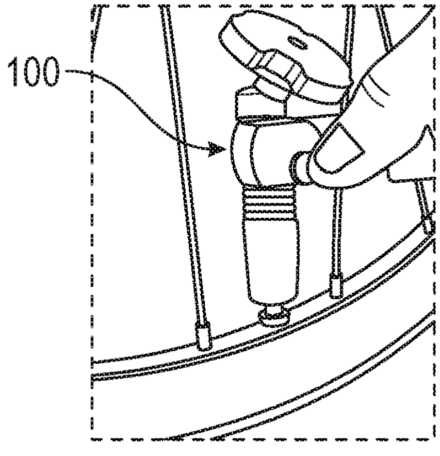

The pressure of, for example, the tire may be measured in this (closed) position. Importantly, the pressure of the tire or other system can be measured when not enough force is exerted on the inflator head 20 to depress the outer spring 62 and there is no fluid communication from the source of pressurized fluid 80 and the system being inflated. In FIG. 4E, excess pressure from the tire may be bled through the bleed valve port 28 while the inflator head 20 is in the first neutral, closed position.

Referring back to FIG. 4C, when the inflator head 20 is in the second compressed, open position, air may flow into the inflator head 20 and into the tire. Specifically, in the second compressed, open position, the shaft 30 has retracted into the sheath 24 of the body 21 such that the inflation conduit 35 is aligned with the air inlet 26 of the body 21.

When the inflator head 20 is positioned over and engages a Presta valve 84, a pressure exerted on the inflator head 20 may cause the spring 60 to depress, allowing the pin 50 to retract into the primary conduit 34. This retraction of the pin 50 into the primary conduit 34 accommodates the Presta valve 84 internally within the cap 40 and/or the stem seal 64. The spring force exerted on the pin 50 by the spring 60 provides enough force to depress any pins or tangs of the Presta valve 84, thereby opening the Presta valve 84. Additionally, the exerted pressure on the inflator head 20 may cause the outer spring 62 to depress, allowing the shaft 30 to move or retract within the sheath 24 of the body 21 and the cap 40 to move closer to the body 21 via the movement of the shaft 30.

Referring briefly to FIG. 3C, when the shaft 30 retracts within the sheath 24, the inflation conduit 35 will align with the air inlet 26 of the body 21, which is aligned with the internal channel 14 of the handle 10. When the inflation conduit 35 is aligned with the air inlet 26 of the body 21, a pressurized fluid may flow from the source of pressurized fluid, through the internal channel 14 of the handle 10, through the air inlet 26, through the inflation conduit 35, into the primary conduit 34, and into the Presta valve. In this way, the inflator head 20 and/or the inflation system 100 may inflate a tire, tube, or other pneumatic device inflated using pressurized fluid (e.g., air, etc.).

Alternatively, when the inflator head 20 is positioned over and engages a Schrader valve, a pressure exerted on the inflator head 20 may cause the internal pin of the Schrader valve to depress, thereby opening the Schrader valve. Specifically, the spring force of the spring 60 (e.g., the internal spring 60 within the primary conduit 34 of the shaft 30) is high enough to cause the internal Schrader valve pin to depress when the inflator head 20 is applied to the Schrader valve. Once the Schrader valve has been opening, the force exerted on the inflator head 20 will cause the outer spring 62 to depress, allowing the shaft 30 to move or retract within the sheath 24 of the body 21 and the cap 40 to move closer to the body 21 via the movement of the shaft 30. As with the Presta valve, when the shaft 30 retracts within the sheath 24, the inflation conduit 35 will align with the air inlet 26 of the body 21, which is aligned with the internal channel 14 of the handle 10, allowing pressurized fluid to flow through the inflator head 20 and into the Schrader valve.

The inflation system 100 does not include any additional levers or pulls that require manipulation to open a flow of pressurized fluid through the inflator head 20. Rather, the flow of pressurized fluid through the inflator head 20 is based on alignment of the inflation conduit 35 of the shaft 30 with the air inlet 26 of the body 21 and the internal channel 14 of the handle 10. This allows the inflation system 100 and the inflator head 20 to be readily positioned over either a Presta valve or Schrader valve and easily open either valve to inflate, for example, a tire. Additionally, the inflation system 100 and the inflator head 20 can be used with one hand, as opposed to conventional inflation systems which require a user to use both hands in order to inflate a tire.

The adaptor or pressure gauge 76 may plug or close the pressure port 37, thereby ensuring that air or pressurized fluid will flow, once in the inflator head 20, through the primary conduit 34 and out of the valve coupling end 42 of the cap 40. A plurality of seals 66 (e.g., gaskets, O-rings, etc.) may be positioned throughout the inflator head 20. For example, one or more seals 66 may be disposed between an exterior of the shaft body 31 and the sheath 24 of the body 21. The exterior of the shaft body 31 may be grooved to receive the one or more seals 66 and allow the shaft body 31 to slidably move within the sheath 24. Additionally, a seal 66 may be placed within the coupling cavity 27 of the body 21, between the top end 13 of the handle 10 and the air inlet 26 of the body 21.

The seals 66 may seal off any crevices or open spaces within the inflator head 20 and ensure that pressurized fluid flows through the primary conduit 34, the inflation conduit 35, the pressure port 37, and/or the valve coupling end 42 of the cap. Or specifically, when the shaft 30 is in its neutral position (FIGS. 3A and 3B) the air inlet 26 is disposed between the two seals 66 (e.g., O-rings) closest to the second shaft end 33 such that the pressurized fluid may not flow into the inflation conduit 35 and the flow is closed to the connected valve. When the shaft 30 is in its second compressed position (FIG. 3C) the body air inlet 26 is disposed between two O-rings 66 on either side of the fluid conduit 35 of the shaft 30 such that the pressurized fluid is allowed into the fluid conduit 35 and then into the primary conduit 34 and the flow is open to the connected valve. The seals 66 on either side of the inflation conduit 35 ensure that pressurized fluid enters the fluid conduit and does not escape the inflator body when in this position.

Figure 6:
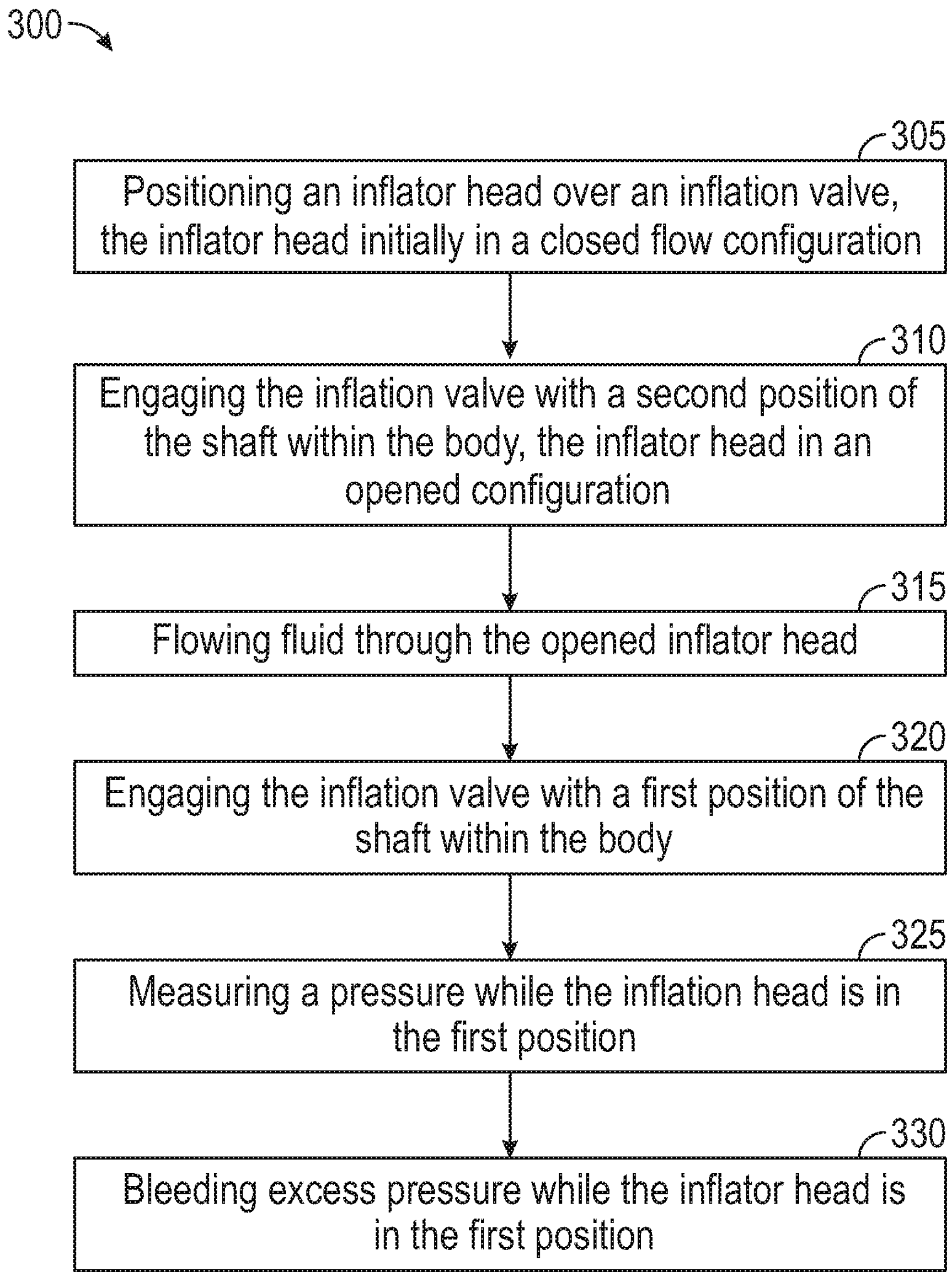
FIGS. 6 and 7 illustrate flowcharts of example methods of using the inflation system of FIGS. 1A through 1C.
Figure 7:
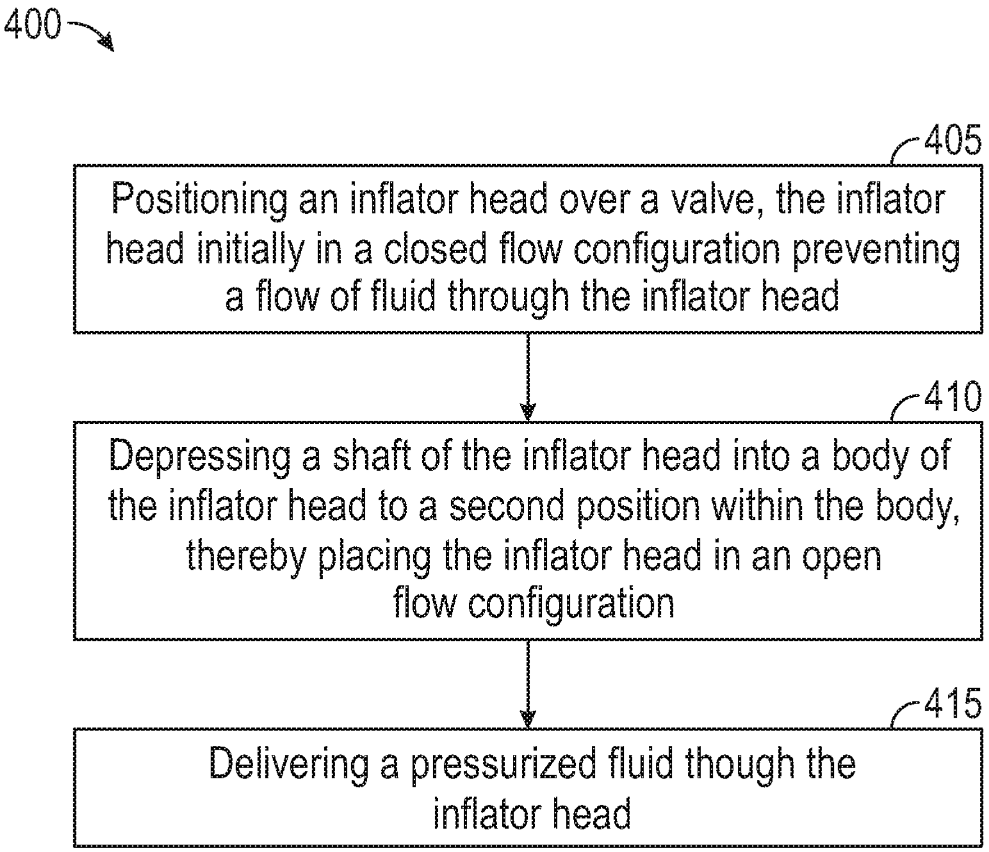
Figure 8B:
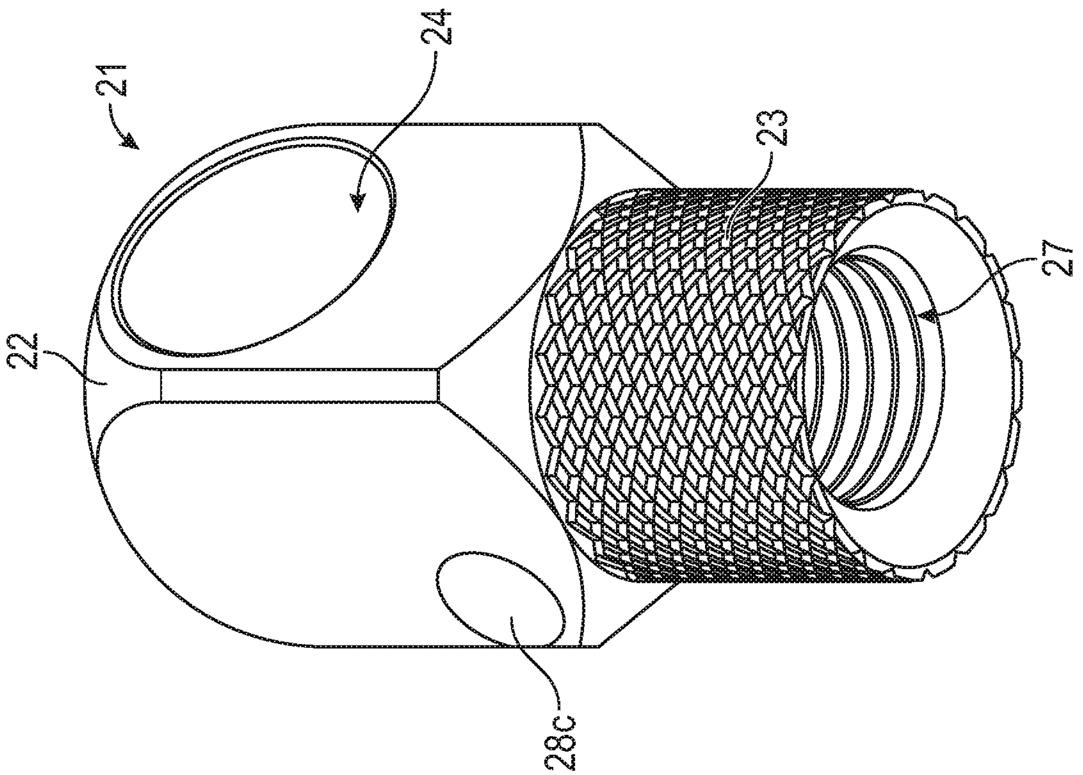
FIGS. 8A and 8B illustrate a body of the inflator head of FIGS. 1A through 3B.
Figure 8A:
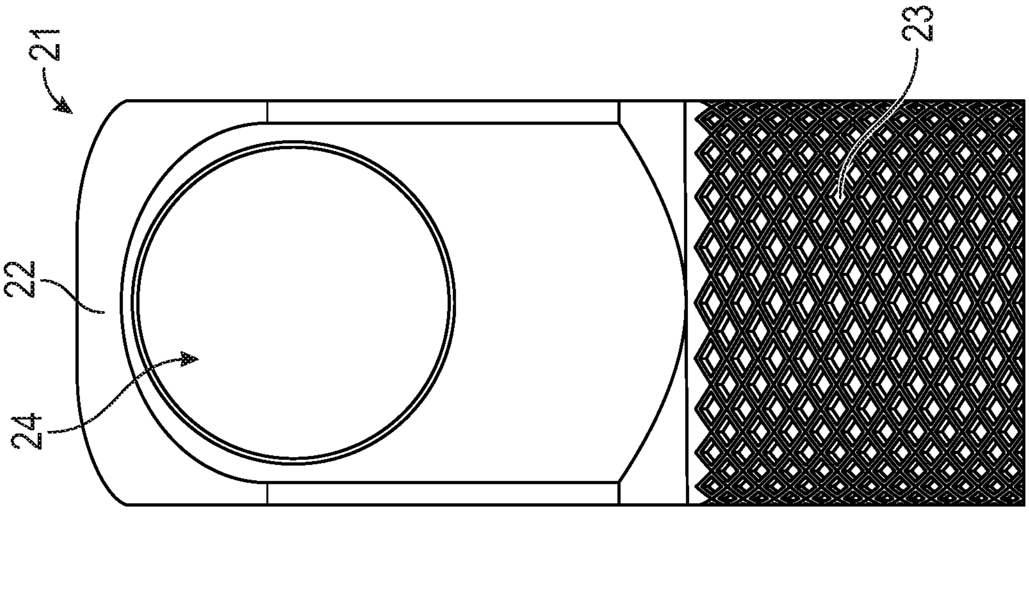

FIGS. 6 and 7 are flowcharts of embodiments of methods of using the inflation system 100. FIG. 6 illustrates a method 300 of inflation including positioning an inflator head over an inflation valve, the inflator head initially in a closed flow configuration, at 305. The inflator head may be the inflator head 20 of FIGS. 1A through 3C. Referring briefly to FIGS. 3A and 3B, when the inflator head 20 is initially positioned over the inflation valve, the cap 40 and the shaft 30 are biased toward the valve coupling end 42 of the cap and away from the body 21. Specifically, the outer spring 62 has not been compressed and is biasing the cap 40 and the shaft 30 toward the valve coupling end 42 of the cap 40 and away from the body 21. As the inflation conduit 35 of the shaft 30 is not aligned with the air inlet 26 of the body 21, the inflator head 20 is closed and no air or pressurized fluid may flow through the inflator head 20.

The method 300 also includes engaging the inflation valve with a second position of the inflator head, at 310. Specifically, the inflation valve is engaged through a second position of the shaft within the body, such that enough force can be exerted to fully seat the inflator head (e.g. a stem seal) over and onto the inflation valve. The method 300 may also include flowing fluid through the opening inflator head, at 315, as the inflator head is in the second compressed, open position. The method 300 may further include engaging the inflation valve with a first position of the shaft within the body, at 320, and measuring a pressure while the inflator head is in the first position, at 325. Engaging the inflation valve with the first position may include reducing the force exerted on the inflator head. In the first position of the inflator head, pressurized fluid may flow through the primary conduit 34 of the shaft 30, through the narrow portion 34*a* of the primary conduit 34, and into the pressure gauge 76. The inflation conduit 35 may not be aligned with the air inlet 26, such that the pressurized fluid flows through the inflator head 20 to the pressure gauge 76.

The method 300 may further include bleeding excess pressure while the inflator head is in the first position, at 330. Excess pressure may be bled through the bleed valve port, which is in fluid communication with the primary conduit while the inflator head is in the first neutral, closed position.

FIG. 7 illustrates a method 400 of delivering a pressurized fluid. The method 400 may include positioning an inflator head over an inflation valve, the inflator head initially in a first closed flow position or configuration preventing a flow of fluid through the inflator head, at 405. As before, the inflator head may be the inflator head 20 of FIGS. 1A through 3B. In the first position of the inflator head 20, the shaft 30 is positioned within the body 21 such that the inflation conduit 35 is not aligned with the air inlet 26, thereby maintaining the closed flow configuration of the inflator head 20.

The method 400 also includes depressing the shaft into the body to a second position within the body, thereby placing the inflator head in an open flow configuration, at 410, and delivering a pressurized fluid through the inflator head, at 415. In the second position of the shaft 30 within the body 31, the inflation conduit 35 is aligned with the air inlet 26, thereby opening the inflator head 20.

FIGS. 8A through 9C illustrate the body 21 that can be incorporated into the inflator head 20 of FIGS. 1A through 3C. As before, the body 21 has a top end 22 and a bottom end 23 opposite the top end 22. Defined between the top end 22 and the bottom end 23 is a sheath or channel 24 that extends through the body 21. Defined in the bottom end 23 is a coupling cavity 27 to receive the second end 13 of the handle 10. The coupling cavity 27 may contain threading to engage with threading at the second end 13 of the handle 10. The body 21 and the handle 10 can also be made from a single piece, thus eliminating any need for threads or otherwise to join them.

Figure 9C:
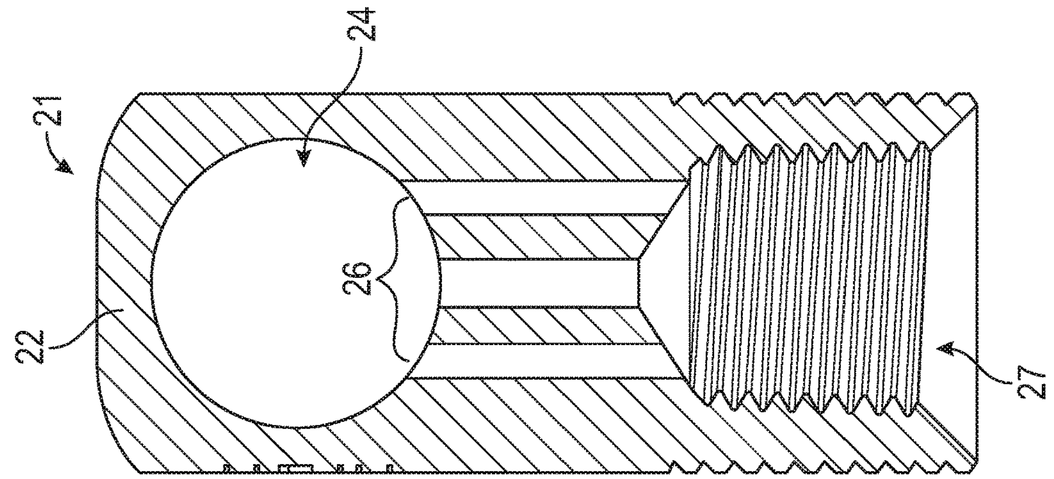
FIGS. 9A through 9C illustrate cross-sectional views of the body of FIGS. 8A and 8B.
Figure 9B:
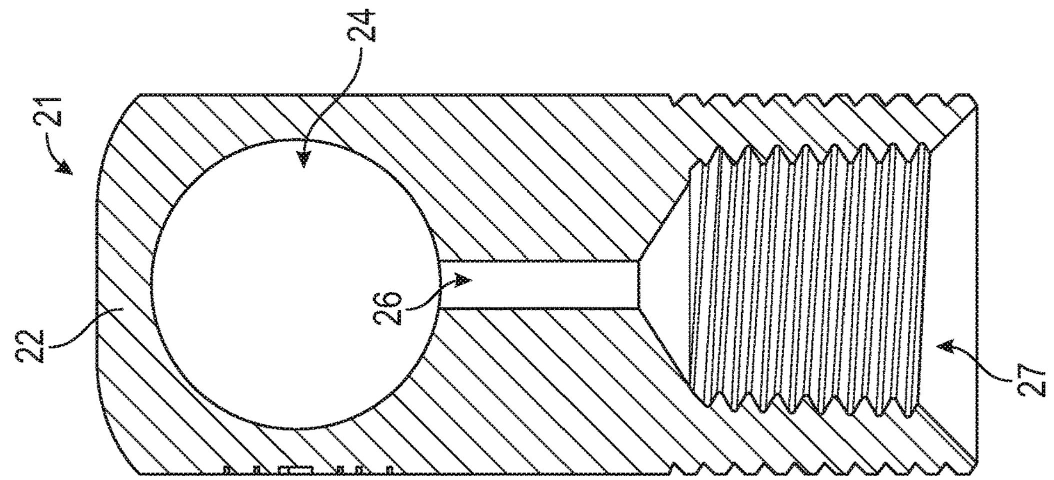
Figure 9A:
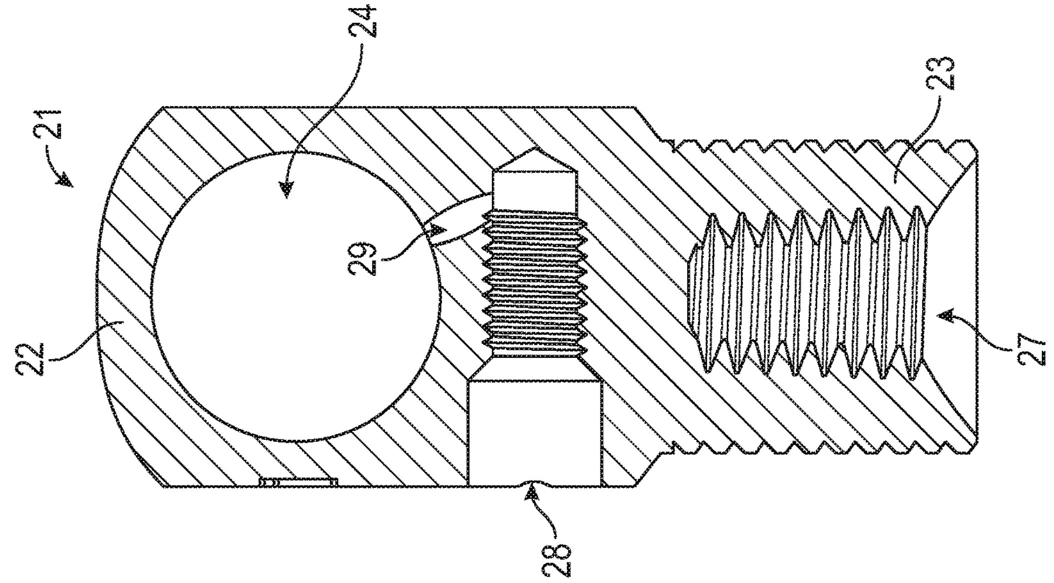

Referring to FIGS. 9A through 9C, defined in the bottom end 23 of the body 21 is an air inlet 26 that is in fluid communication with the internal channel 14 of the handle

10. The air inlet 26 may fluidly connect the handle 10 with the inflator head 20, such that pressurized fluid can flow from a source of pressurized fluid, through the handle 10 (i.e., through the internal channel 14), through the air inlet 26, and into the inflator head 20. In some embodiments, such as illustrated in FIG. 9C, the air inlet 26 may include multiple air inlets 26 to facilitate a flow of pressurized fluid or gas into the body 21 of the inflator head 20. Multiple air inlets 26 may be included because simply enlarging the air inlet 26 provides a location for any seals 66 to get caught during motion of the shaft 30 within the body 21.

The body 21 also defines a bleed port valve 28 that receives a cap 28*c* for selectively closing the bleed port valve 28. The cap 28*c* can be received by the bleed port valve 28 (e.g., screwed into, press-fit into, etc.) and the cap 28*c* can be actuated to selectively open and close the bleed port valve 28. The bleed port valve or pressure release valve 28 may be disposed beneath the sheath 24, above the coupling cavity 27, and adjacent to the air inlet 26. In a closed position of the inflator head 20, the bleed port valve 28 may be located between seals 66 such that the bleed port valve 28 is in fluid communication and aligned with the inflation conduit 35 (see FIG. 3B). Due to the alignment with the inflation conduit 35, which is in fluid communication with the primary conduit 34, the bleed port valve 28 is also in fluid communication with the primary conduit 34 such that air or excess pressure may be bled through the primary conduit 34 and out of the bleed port valve 28.

The bleed port valve 28 is fluidly connected to the sheath 24 through a bleed valve channel 29. The bleed valve channel 29 may include an angle or curve, so that the bleed port valve 28 is accessible via an exterior of the body 21 and the bleed valve channel 29 is internally defined within the body 21. The bleed port valve 28 allows access to pressure of an item being inflated by the inflator head 20 (e.g., a tire) while the inflator head 20 is in the closed-flow configuration (i.e., no fluid is flowing through the inflator head 20 from a pressurized source). That is, the bleed port valve 28 allows a user to gradually relieve any excess pressure in the item without risk of flowing pressurized fluid into the item.

For example, referring back to FIGS. 3A and 3B, the inflator head 20 slidably receives the shaft 30 within the sheath 24 of the body 21. The shaft 30 defines the primary conduit 34 that extends from the first shaft end 32, through the body 31, and to the second shaft end 33. The shaft 30 and/or the body 31 also defines the inflation conduit 35 extending through the sidewall 31*a* of the body 31. Depending on a position of the shaft 30 within the sheath 24 of the body 21, the inflation conduit 35 can be in fluid communication with the bleed valve channel 29 and the bleed valve port 28, such that pressurized fluid can flow from the excessively pressurized item (e.g., a tire), through the primary conduit 34, into the inflation conduit 35, and into the bleed valve channel 29 for exit through the bleed valve port 28. The inflation conduit 35 is substantially aligned with the bleed valve channel 29 when the inflator head 20 is in the closed flow configuration. That is, the outer spring 62 has not been depressed and the inflation conduit 35 is not aligned with the air inlet 26 of the body.

Figure 10A:
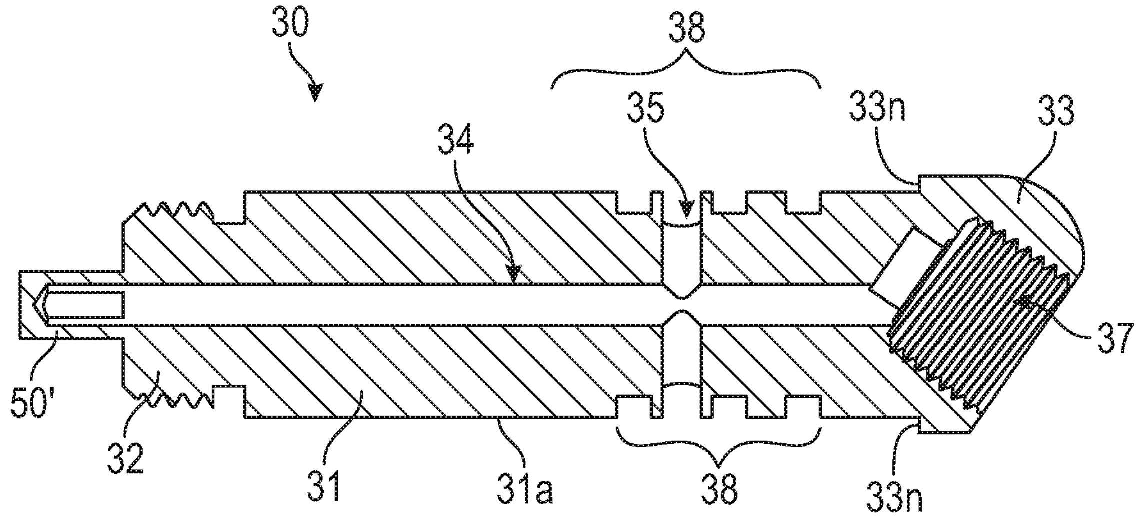
FIGS. 10A and 10B illustrate cross-sectional views of one embodiment of the shaft of the inflator head of FIGS. 1A through 3B.
Figure 10B:
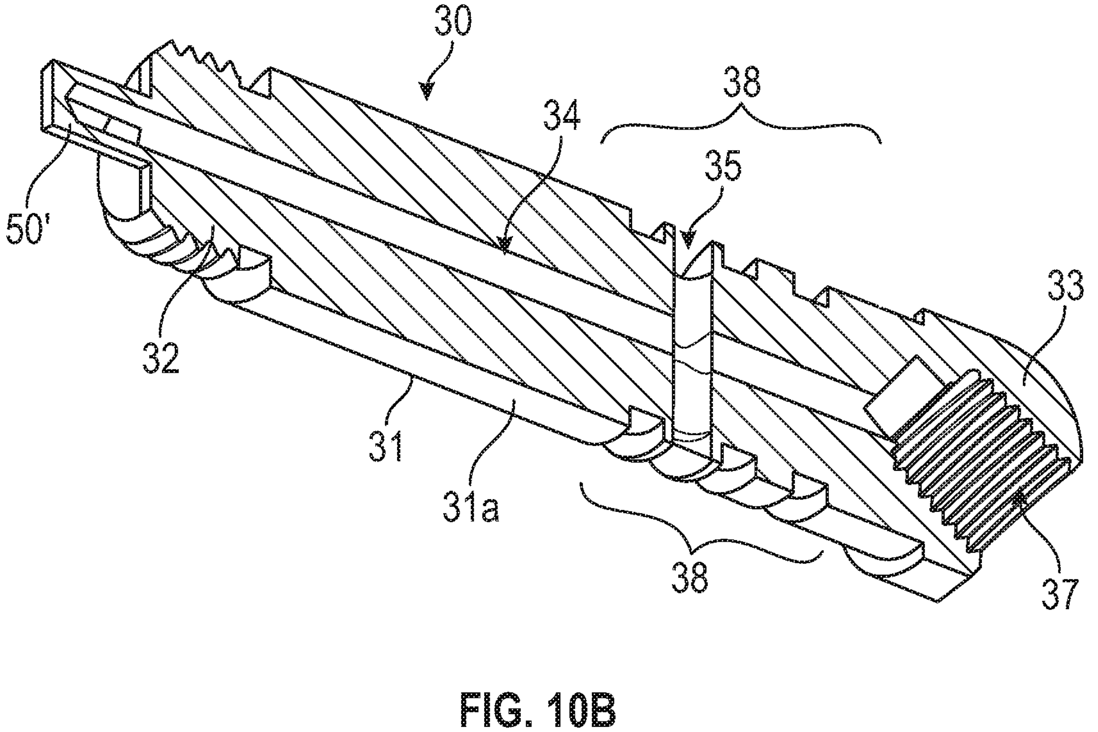

FIGS. 10A and 10B illustrate cross-sectional views of one embodiment of the shaft 30 of the inflator head 20. The shaft 30 includes the body 31 having a side wall 31*a*. The body 31 defines the primary conduit 34, which extends from the first shaft end 32 to the second shaft end 33 opposite the first shaft end 32. The body also defines the inflation conduit 35, which extends from an exterior of the side wall 31*a* towards the primary conduit 34 and intersects with the primary conduit 34. Disposed near the second shaft end 33 may be one or more notches 33*n*, which may themselves prevent, or may receive a clip which may prevent, the shaft 30 from sliding out of the sheath 24 of the body 21. Specifically, the notches 33*n* may provide a transition between the second shaft end 33, having a second outer diameter, and the first shaft end 32, having a first outer diameter less than the second outer diameter. The first outer diameter of the first shaft end 32 allows the shaft 30 to slide within the sheath 24 of the body, while the second outer diameter at the second shaft end 33 ensures the shaft 30 cannot slide fully through and out of the body 21 during use of the inflation system 100. Referring briefly to FIGS. 3A and 3B, the notches 33*n* abut the body 21 when the shaft 30 is in the first, closed position within the body 21.

The second shaft end 33 defines the pressure port 37 for receiving and engaging a pressure gauge 76. Defined about the inflation conduit 35 are one or more grooves 38 for receiving seals 66. The inflation conduit 35 is defined between grooves 38, such that inclusion of seals 66 does not seal or close off the inflation conduit 35.

As illustrated in FIGS. 10A and 10B, the shaft 30 has an integral pin 50' (rather than an actuating or moveable pin, such as pin 50 from FIGS. 2B and 3B). Specifically, the integral pin 50' is integrated to the first shaft end 32 as a single, solid piece. The integral pin 50' simplifies the overall inflator head 20 by reducing the part count and eliminating the need for an internal spring 60. The fixed, integral pin 50' eliminates any variability from the actuating pin 50 and results in a more reliable actuation of the, for example, Schrader valve's 85 center pin. The integral pin 50' can be as simple as having a cap geometry (or a hollow cylinder with one end closed) with either a slit in the top that reaches the primary conduit 34 and allows flow, or removal of material from the outer diameter of the 'cap' geometry until a flow path is achieved. The remaining geometry is able to actuate the center pin of a Schrader valve 85 while still allowing fluid flow through it. In other variations this pin can be fixed (i.e. not actuating) while also not being integral to the shaft-consider an actuating pin 50 sized such that it is a press fit into the primary shaft conduit 34 and unable to move once assembled but is not integral to the shaft 30.

Figure 11:
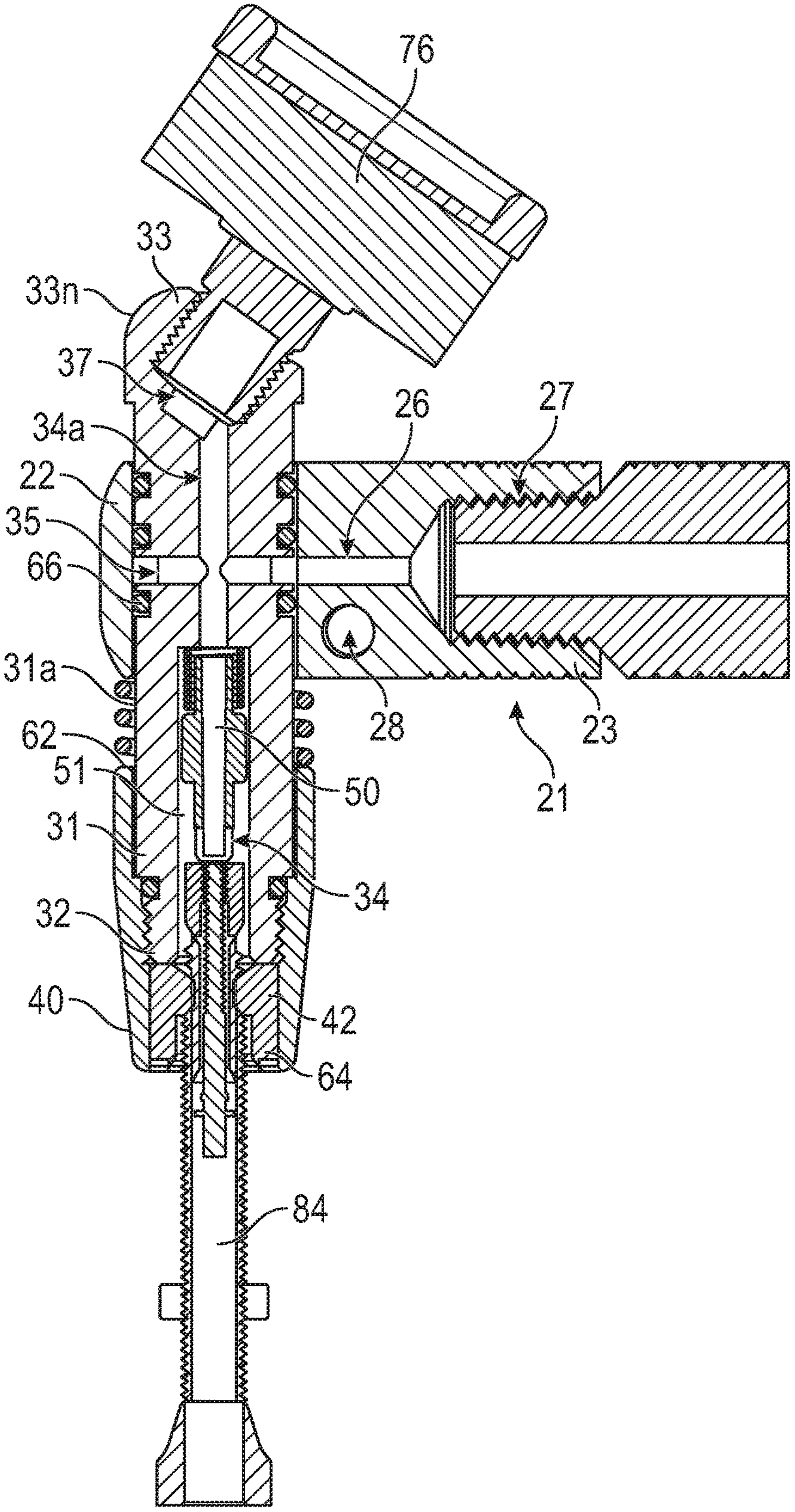
FIG. 11 illustrates the cross-sectional view of FIG. 10 where the inflator head has received a Presta valve for inflation.
Figure 12:
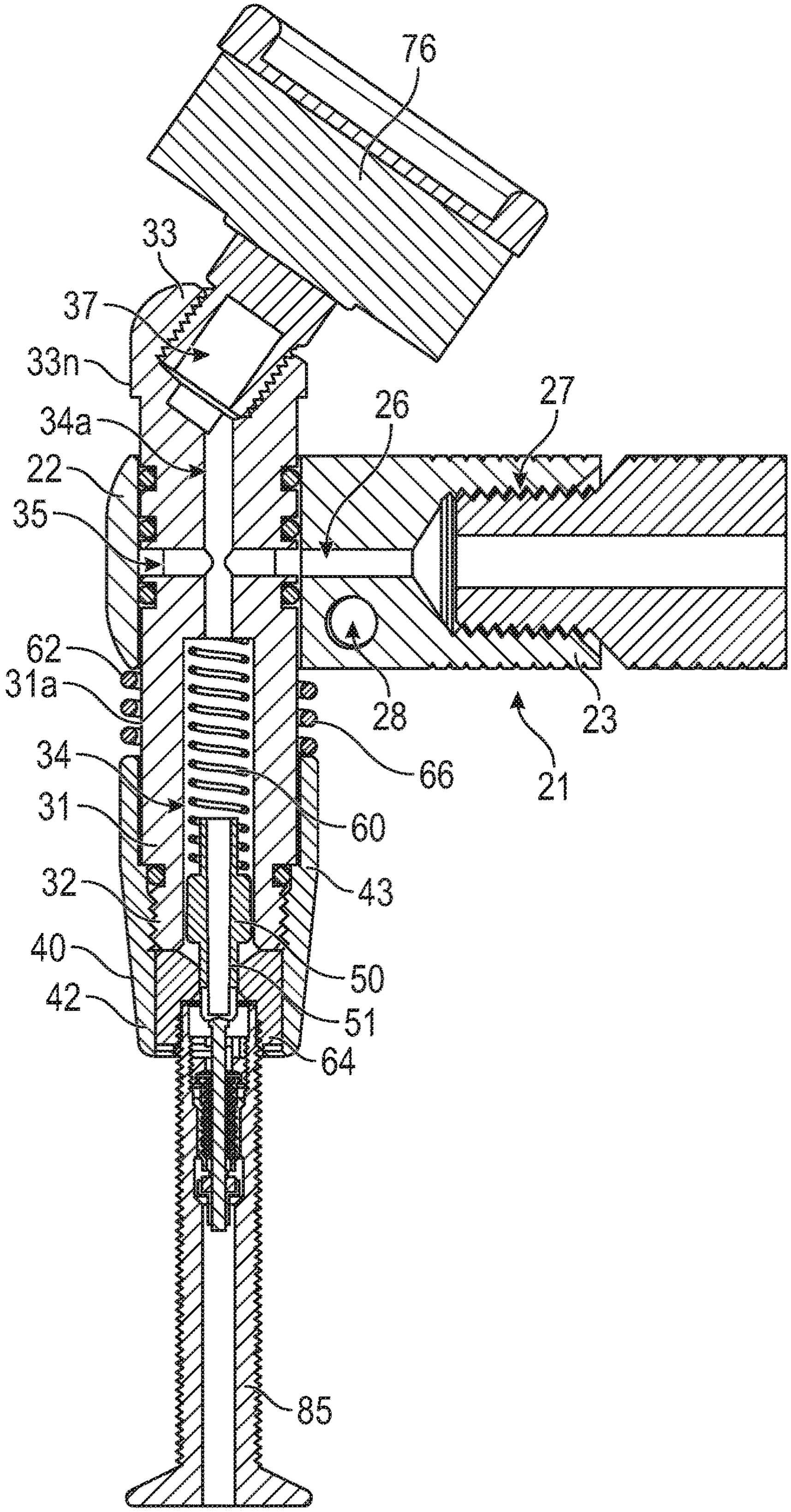
FIG. 12 illustrates the cross-sectional view of FIG. 10 where the inflator head has received a Schrader valve for inflation.

FIGS. 11 and 12 each illustrate the cross-sectional view of the inflator head 20 of FIGS. 1A through 3C having received a valve. Specifically, FIG. 11 illustrates the inflator head 20 having received a Presta valve 84 and FIG. 12 illustrates the inflator head 20 having received a Schrader valve 85. Both the Presta valve 84 and the Schrader valve 85 are partially received through the valve stem seal 64.

As illustrated in FIG. 11, when the inflator head 20 receives a Presta valve 84, the pin 50 (the actuating pin 50) retracts substantially into the primary conduit 34 of the shaft 30 and compresses the internal spring 60. Additionally, the shaft 30 slides within the sheath 24 of the body 21 such that the outer spring 62 compresses against the top end 22 of the body 21 and the inflation conduit 35 is aligned with the air inlet 26. This allows air or another compressed fluid to flow through the internal channel 14 of the handle 10, into the inflation conduit 35 and into the Presta valve 84, thereby inflating a tire or other pneumatic device. The thin profile of the Presta valve 84 allows the Presta valve 84 to be partially received within the valve stem seal 64 and extend into the primary conduit 34. Once the Presta valve 84 is fully received into the stem seal 64 it rests against the first pin end 51 of the fully recessed actuating pin 50. The second pin end 52 of the actuating pin 50 will rest against the interior shoulder 34*b* of the primary conduit 34. This rigid distance of the pin 50, the interior shoulder 34*b* and the Presta valve 84 is defined such that it aligns the stem seal 64 to the proper location on the Presta valve 84, for optimal sealing. This defined rigid distance also prevents the Presta valve 84 from being over inserted into the valve stem seal 64. The spring force generated by the compressed internal spring 60 provides enough force to overcome any air pressure contained within the Presta valve 84 and open the Presta valve 84 to allow air to flow therethrough.

As illustrated in FIG. 12, when the inflator head 20 receives a Schrader valve 85, the pin 50 (the actuating pin 50) retracts partially into the primary conduit 34 of the shaft 30 and partially into the valve stem seal 64, with the internal spring 60 compressing but less so than when the inflator head 20 receives the Presta valve 84. Additionally, the shaft 30 slides within the sheath 24 of the body 21 such that the outer spring 62 compresses against the top end 22 of the body 21 and the inflation conduit 35 is aligned with the air inlet 26. This allows air or another compressed fluid to flow through the internal channel 14 of the handle 10, into the inflation conduit 35 and into the Schrader valve 85, thereby inflating a tire or other pneumatic device. The spring force generated by the compressed internal spring 60 provides enough force against the pin 50 to allow the pin 50 to depress a pin of the Schrader valve 85, thereby opening the Schrader valve 85 and allowing air to flow therethrough.

The inflation system 100 of the present disclosure allows for simplified and quick manufacturing. For example, due to the geometric simplicity of each component within the inflator head 20, manufacturing costs are able to be minimized. As each component of the inflator head 20 is largely axisymmetric with simple off-axis features, they readily lend themselves to being machined out of stock material on modern screw machines or CNC lathes. This machining method requires minimal human intervention in the setup and machining process and significantly decreases the cost of each individual part. The additional cost benefit to using stock material is that no expensive custom metal molds are required in order to cast complex inflator bodies out of molten metal, which is generally a requirement for nearly all comparable inflators currently on the market. This elimination of custom tooling significantly reduces the start-up cost associated with manufacturing a new tool.

Further, the inflation system 100 and the inflator head 20 incorporate all key features standard to modern inflators into an extremely compact and mechanically robust (or simple) design that is both easy to produce and easy to use. The compact design reduces the raw material required to manufacture the inflator head 20, while not sacrificing on performance with air conduits designed to deliver sufficient air to the receiving valve such that max air flow-rates (allowed by the Presta valves 84 or Schrader valves 85 cross-sections) are still achieved.

The ease of manufacturing due to the simple geometry of each individual component results in significant cost savings. Additionally, the inflation system 100 and inflator head 20 of the present disclosure reduces overall part count and, in some cases, has less than half the individual components of comparable air inflators currently on the market. The ease of manufacturing and ease of assembly is complimented by the ease of operation. Eliminating several of the steps commonly required by current inflators to mate the inflator head 20 to a receiving valve, this design instead uses the same motion of pushing the inflator head 20 onto to the valve 84, 85 to both seat the inflator head 20 and then actuate the inflator head 20 to begin filling the item (e.g., a tire, etc.). To remove the inflator head 20, the reverse is simply done (i.e., the inflator head 20 is simply pulled from the valve 84, 85) without any additional steps. This simple single motion use is not only intuitive and user friendly, but also results in increased efficiency and faster fill times by eliminating additional steps.

While the compact design limits material, the rigid design eliminates the need for additional petroleum based rubber tubing, and the stock material eliminates the energy inefficient process of casting molten metals which is typically used to make the bodies of conventional tire inflators. All of this makes the manufacturing process of this inflator more energy efficient and environmentally friendly.

The systems, devices, and methods of the present disclosure allows the inflator or inflator head to be pushed, seated, clipped or clamped onto the valve stem (e.g., the Presta or Schrader valve) such that only one hand is needed throughout this process and can be configured as a whole inflation system such that no secondary gauges, bleed valves, tools or otherwise are needed for a tire's pressure maintenance. Though the disclosure has discussed the systems in relation to inflating tires (e.g., bike tires, car tires, motorcycle tires, etc.), other devices or structures are contemplated such as tubes, balls, balloons, mattresses, etc. Additionally, the disclosed systems can be used to deliver pressurized air or fluid through devices such as sprinklers or other pipe installations, refrigeration and air conditioning systems, shock absorbers, and buoyancy compensator inflators for SCUBA systems. Further, the disclosed systems can be used with any device utilizing a Presta, Schrader valve, or other similar valves.

What is claimed:

1. An inflator comprising:

a body with an air inlet that receives pressurized gas from a source of pressurized gas;

a sheath extending through the body;

a shaft slidably received by the sheath and having a first shaft end and a second shaft end, the shaft including:

a primary conduit extending through a length of the shaft and opening to the first shaft end, an inflation conduit extending through a sidewall of the shaft from an exterior of the sidewall to the primary conduit, and a pressure port defined in the second shaft end;

a cap attachable to the first shaft end and having a valve coupling end; and an outer spring biasing the cap away from the body, wherein the inflator engages and selectively opens a Presta valve and/or a Schrader valve.

2. The inflator of claim 1, wherein the shaft has:

a closed position in which the inflation conduit of the shaft and the air inlet of the body are unaligned and no air flows through the cap; and a flow position in which the inflation conduit of the shaft and the air inlet of the body are aligned and air flows through the cap.

3. The inflator of claim 2, wherein, in the closed position, excess pressure from the system being inflated is bled through a bleed port valve defined in the body upon actuation of a bleed port cap.

4. The inflator of claim 1, further comprising:

a pin integral to the first shaft end.

5. The inflator of claim 1, further comprising:

an actuating pin having a first pin end received within the cap and a second pin end received within the primary conduit of the shaft; and an internal spring within the primary conduit of the shaft and in connection with the second pin end, the internal spring biasing the actuating pin towards the cap.

6. The inflator of claim 1, further comprising:

a first seal within the cap and around the pin.

7. The inflator of claim 1, further comprising:

a bleed port valve on the body that enables excess pressure to be released from a system inflated with the inflator.

8. An inflation system comprising:

an inflator head comprising:

a body defining a central lumen, an air inlet, and a bleed port valve, a shaft slidably received within the central lumen of the body, the shaft having a first end and a second end, a cap attachable to the first end of the shaft, and a pin received within the cap;

a pressure gauge attachable to the second end of the shaft; and a handle attachable to the body, wherein the shaft is movable from a first position to a second position different than the first position, and wherein the inflator head is closed and does not allow air flow through the inflator head when the shaft is in the first position.

9. The inflation system of claim 8, wherein the inflator head can measure a pressure when the shaft is in the first position.

10. The inflation system of claim 8, wherein the inflator head is in an open flow configuration when the shaft is in the second position.

11. A method of inflation comprising:

positioning an inflator head over an inflation valve, the inflator head initially in a closed flow configuration;

engaging the inflation valve with the inflator head;

measuring a pressure while the inflator head is in the closed flow configuration;

compressing the inflator head to an open flow configuration; and flowing fluid through the inflator head while in the open flow configuration.

12. The method of inflation of claim 11, wherein positioning an inflator head over an inflation valve comprises placing a cap of the inflator head over the inflation valve.

13. The method of inflation of claim 11, wherein engaging the inflation valve with the inflator head comprises pushing a cap of the inflator head onto the inflation valve, thereby causing a shaft connected to the cap to retract at least partially into a body of the inflator head.

14. The method of inflation of claim 11, wherein the inflation valve is a Presta valve.

15. The method of inflation of claim 11, wherein the inflation valve is a Schrader valve.

16. A method of delivering a pressurized fluid comprising:

positioning an inflator head over a valve, the inflator head initially in a closed flow configuration preventing a flow of fluid through the inflator head;

engaging the inflation valve with the inflator head;

bleeding excess pressure through a bleed valve of the inflator head while the inflator head is in the closed flow configuration;

depressing a shaft of the inflator head into a body of the inflator head, thereby placing the inflator head in an open flow configuration; and delivering a pressurized fluid through the inflator head in the open flow configuration.

17. The method of delivering a pressurized fluid of claim 16, further comprising measuring a pressure when the inflator head is in the closed flow configuration.

18. The method of delivering a pressurized fluid of claim 16, wherein depressing the shaft into the body of the inflator head comprises:

compressing an exterior spring; and aligning an inflation conduit of the shaft with an air inlet of the body.

19. An inflator head comprising:

a body defining an air inlet; a shaft slidably received by the body, the shaft having a first shaft end that can communicate with a valve, a second shaft end opposite the first shaft end and in fluid communication with the first shaft end, and a pressure port at the second shaft end, the inflator head in a closed flow configuration when the shaft is in a first position relative to the body and in an open flow configuration when the shaft is in a second, depressed position relative to the body.

20. The inflator head of claim 19, further comprising:

a cap at the first shaft end and having an opening that engages the valve.

21. The inflator head of claim 19, wherein the shaft further comprises a primary conduit extending between the first shaft end and the second shaft end and an inflation conduit oriented normal to the primary conduit and in fluid communication with the primary conduit, the inflation conduit placeable in communication with the air inlet of the body.

22. The inflator head of claim 19, wherein the inflator head is in the open flow configuration when the inflation conduit of the shaft is aligned with the air inlet when the shaft is in the second, depressed position within the body.

23. The inflator head of claim 19, further comprising, a bleed port valve on the body, adjacent to the air inlet, but not in fluid communication with the air inlet, the bleed port valve enabling bleeding of excess pressure from an inflatable system when the inflator head is in a closed flow configuration.

24. The inflator head of claim 19, further comprising:

a stem seal that provides both an air-tight connection to a valve stem and sufficient clamping force to the valve stem such that it is not overcome/unseated by the tire pressure alone.

* * * * *